US009386425B2

(12) United States Patent
Yu et al.

(10) Patent No.: US 9,386,425 B2
(45) Date of Patent: Jul. 5, 2016

(54) GROUP COMMUNICATION OVER LTE EMBMS

(71) Applicant: MEDIATEK INC., Hsinchu (TW)

(72) Inventors: Chia-Hao Yu, Yilan County (TW);
Chia-Chun Hsu, New Taipei (TW);
Yih-Shen Chen, Hsinchu (TW);
Chien-Chun Huang-Fu, Hsinchu (TW);
Yu-Syuan Jheng, Taipei (TW);
Chia-Hung Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 86 days.

(21) Appl. No.: 14/221,631

(22) Filed: Mar. 21, 2014

(65) Prior Publication Data
US 2014/0286222 A1    Sep. 25, 2014

Related U.S. Application Data

(60) Provisional application No. 61/804,392, filed on Mar. 22, 2013, provisional application No. 61/804,398, filed on Mar. 22, 2013, provisional application No. 61/804,402, filed on Mar. 22, 2013, provisional application No. 61/804,405, filed on Mar. 22, 2013.

(51) Int. Cl.
*H04B 7/00*    (2006.01)
*H04W 4/08*    (2009.01)
(Continued)

(52) U.S. Cl.
CPC ........ *H04W 4/08* (2013.01); *H04W 4/10* (2013.01); *H04W 36/08* (2013.01); *H04W 36/32* (2013.01);
(Continued)

(58) Field of Classification Search
CPC .................... H04W 76/025; H04W 92/10
USPC .............. 370/310, 328, 329, 349, 431, 464
See application file for complete search history.

(56) References Cited

U.S. PATENT DOCUMENTS 8,077,716 B2 * 12/2011 Yi et al. .................... 370/390
8,195,166 B1    6/2012 Oprescu-Surcobe et al. 455/439
(Continued)

FOREIGN PATENT DOCUMENTS

CN    101043252 A    9/2007
CN    101370157 A    2/2009
(Continued)

OTHER PUBLICATIONS

International Search Report and Written Opinion of International Search Authority for PCT/CN2014/073971 dated May 23, 2014 (11 pages).
(Continued)

*Primary Examiner* — Dmitry H Levitan
(74) *Attorney, Agent, or Firm* — Imperium Patent Works; Zheng Jin

(57) ABSTRACT

A method of supporting group communication over LTE MBMS is provided. A UE first establishes a unicast Evolved Packet Service (EPS) bearer in an LTE network for group communication. The UE belongs to a communication group having a communication group ID. The UE receives access information from the network for monitoring downlink (DL) multicast traffic of the DL group communication based on a multicast decision. The UE is then ready for monitoring a multicast Multimedia Broadcast Multicast Service (MBMS) bearer for receiving the DL multicast traffic. The multicast MBMS bearer is associated with a Temporary Mobile Group Identifier (TMGI), and wherein the TMGI is associated with the communication group ID. In one embodiment, the access information comprises mapping information between the TMGI and the communication group ID.

21 Claims, 20 Drawing Sheets

FLOW CHART OF SUPPORTING GROUP MULTICAST TRAFFIC WITH MBMS IN LTE NETWORK

(51) Int. Cl.
*H04W 4/10* (2009.01)
*H04W 36/32* (2009.01)
*H04W 72/00* (2009.01)
*H04W 36/08* (2009.01)
*H04W 76/00* (2009.01)
*H04W 4/06* (2009.01)
*H04W 74/00* (2009.01)

(52) U.S. Cl.
CPC .......... *H04W 72/005* (2013.01); *H04W 76/002* (2013.01); *H04W 4/06* (2013.01); *H04W 72/00* (2013.01); *H04W 74/006* (2013.01)

(56) References Cited

U.S. PATENT DOCUMENTS

| | | | |
|---|---|---|---|
| 8,451,765 B2 | 5/2013 | Wang et al. | 370/312 |
| 8,626,153 B2* | 1/2014 | Vaittinen et al. | 455/430 |
| 8,750,179 B2* | 6/2014 | Purnadi et al. | 370/310 |
| 8,750,181 B2 | 6/2014 | Purnadi et al. | 370/310 |
| 8,812,054 B2 | 8/2014 | Hannu et al. | 455/558 |
| 8,861,419 B2* | 10/2014 | Korus et al. | 370/312 |
| 9,042,291 B2* | 5/2015 | Korus et al. | 370/312 |
| 2007/0019645 A1 | 1/2007 | Menon | 370/390 |
| 2007/0168523 A1 | 7/2007 | Jiang et al. | 709/228 |
| 2007/0249333 A1 | 10/2007 | Hwang et al. | 455/422.1 |
| 2008/0287129 A1 | 11/2008 | Somasundaram et al. | 455/436 |
| 2009/0059831 A1 | 3/2009 | Li et al. | 370/312 |
| 2009/0149164 A1 | 6/2009 | Cai | 455/414.2 |
| 2009/0286468 A1* | 11/2009 | Kim et al. | 455/3.03 |
| 2009/0303909 A1 | 12/2009 | Farhoudi et al. | 370/312 |
| 2010/0128649 A1 | 5/2010 | Gonasa et al. | 370/312 |
| 2010/0284291 A1 | 11/2010 | Perras et al. | 370/252 |
| 2011/0038299 A1* | 2/2011 | Sugawara et al. | 370/312 |
| 2012/0163204 A1 | 6/2012 | Oprescu-Surcobe et al. | 370/252 |
| 2012/0170501 A1* | 7/2012 | Drozt et al. | 370/312 |
| 2012/0170502 A1 | 7/2012 | Korus et al. | 370/312 |
| 2012/0176953 A1* | 7/2012 | Chao et al. | 370/312 |
| 2012/0236776 A1 | 9/2012 | Zhang et al. | 370/312 |
| 2012/0243486 A1 | 9/2012 | Zeira et al. | 370/329 |
| 2013/0044668 A1 | 2/2013 | Purnadi et al. | 370/312 |
| 2013/0114405 A1 | 5/2013 | Kim et al. | 370/230 |
| 2013/0229974 A1 | 9/2013 | Xu et al. | 370/312 |
| 2014/0036755 A1 | 2/2014 | Lee et al. | 370/312 |
| 2014/0140260 A1* | 5/2014 | Wang et al. | 370/312 |
| 2014/0161020 A1 | 6/2014 | Jung et al. | 370/312 |
| 2014/0269419 A1 | 9/2014 | Han et al. | 370/254 |
| 2014/0286223 A1* | 9/2014 | Yu et al. | 370/312 |
| 2014/0286224 A1* | 9/2014 | Yu et al. | 370/312 |
| 2014/0286225 A1* | 9/2014 | Yu et al. | 370/312 |
| 2015/0208379 A1 | 7/2015 | Lin | 370/312 |

FOREIGN PATENT DOCUMENTS

| | | |
|---|---|---|
| CN | 101877829 A | 11/2010 |
| CN | 102469415 A | 5/2012 |
| CN | 102740231 A | 10/2012 |
| CN | 102761828 A | 10/2012 |
| CN | 102769827 A | 11/2012 |
| EP | 2482513 A1 | 8/2012 |
| EP | 2658338 A1 | 10/2013 |
| WO | WO2008135933 A9 | 2/2009 |
| WO | WO2011025825 A1 | 3/2011 |
| WO | WO2012097690 A1 | 7/2012 |
| WO | WO2013025235 A1 | 2/2013 |

OTHER PUBLICATIONS

International Search Report and Written Opinion of International Search Authority for PCT/CN2014/073968 dated Jun. 10, 2014 (13 pages).
International Search Report and Written Opinion of International Search Authority for PCT/CN2014/073963 dated Jun. 30, 2014 (11 pages).
International Search Report and Written Opinion of International Search Authority for PCT/CN2014/073953 dated Jul. 8, 2014 (12 pages).
USPTO Office Action for related U.S. Appl. No. 14/221,664 dated Sep. 22, 2015 (19 pages).
R2-073400 3GPP TSG RAN WG3 Meeting #57, Ericsson, MBMS Service Continuity, Athens, Greece dated Aug. 20-24, 2007 (3 pages).
R2-114266 3GPP TSG RAN WG2 Meeting #75, Intel Corporation, MBMS Service Continuity in RRC_IDLE, Athens, Greece dated Aug. 22-26, 2011 (3 pages).
R2-114280 3GPP TSG-RAN WG2 Meeting #75, Alcatel-Lucent Shanghai Bell et al., Neighboring Cell MBMS Service Information for Service Continuity, Athens, Greece dated Aug. 22-26, 2011 (2 pages).
R3-070711 3GPP TSG RAN WG3 Meeting #55bis, Huawei, Single-Cell MBMS Continuity during Intra-LTE HO, St. Julian, Malta dated Mar. 27-30, 2007 (2 pages).
R3-112363 3GPP TSG-RAN WG3 Meeting #73bis, Huawei, MBMS Service Continuity, Zhuhai, China dated Oct. 10-14, 2011 (4 pages).
USPTO Office Action for related U.S. Appl. No. 14/221,722 dated Jul. 23, 2015 (10 pages).
USPTO Office Action for related U.S. Appl. No. 14/221,689 dated Sep. 29, 2015 (11 pages).
EPO, Search Report for the EP patent application 14770890.3 dated Oct. 7, 2015 (8 pages).
3GPP TSG-RAN WG2 #67 R2-094507, Ericsson et al., Notification Mechanism for Multiple MCCHs, Shenzhen, China dated Aug. 24-28, 2009 (4 pages).
3GPp TSG WG2 Meeting #74 R2-113035, Research in motion UK Limited, Further Consideration for the MBMS Service Continuity, Barcelona, Spain dated May 9-13, 2011 (3 pages).
3GPP TSG-SA WG1 ad-hoc on GCSE_LTE and ProSe S1-130034, General Dynamics Broadband UK, GCSE_LTE: Analysis of Possible Interactions between 3GPP and Application Layer Entities, Prague, Czech Republic dated Jan. 23-25, 2013 (10 pages).
EPO, Search Report for the EP patent application 14769717.1 dated Oct. 7, 2015 (8 pages).
OMA PoC Multicast; Approved Version 2.1-0.2 Aug. 2011, Open Mobile Alliance sections 4.1.1, 5.6, 6, 7, Appendix C.
EPO, Search Report for the EP patent application 14770902.6 dated Oct. 8, 2015 (8 pages).
3GPP TSG-RAN WG2 #67 R2-094506, Ericsson et al., Impact of M-RNTI on PDCCH and on UE Battery Consumption, Shenzhen, China dated Aug. 24-28, 2009 (6 pages).
GP-041007, Siemens, Common Feedback Channel for MBMS Data Transfer, Cancun, Mexico dated Apr. 19-23, 2004 (6 pages).
EPO, Search Report for the EP patent application 14767755.3 dated Oct. 8, 2015 (9 pages).
3GPP TSG-RAN WG2 Meeting #79 R2-123476, ASUSTeK, MBMS Service Continuity for Connection Re-Establishment, Qindao, China dated Aug. 13-17, 2012 (2 pages).

* cited by examiner

POC DL TRAFFIC MULTICASTING USING MBMS

POC SERVER FOR GROUP MOBILITY MANAGEMENT AND
MBMS BROADCAST MODE

POC SERVER FOR GROUP MOBILITY MANAGEMENT

POC SERVER FOR MAKING MULTICAST DECISION FOR POC TRAFFIC

MBMS CAPABILITY INDICATION

MBMS RECEPTION STATUS INDICATION

ESTABLISH UNICAST BEARER FOR POC UL TRAFFIC

ESTABLISH UNICAST BEARER FOR POC UL TRAFFIC

PROACTIVE MBMS BEARER ESTABLISHMENT BASED ON
MBMS BROADCAST MODE

MBMS GATEWAY FOR GROUP MOBILITY MANAGEMENT AND
MBMS MULTICAST MODE

FLOW CHART OF SUPPORTING GROUP MULTICAST TRAFFIC
WITH MBMS IN LTE NETWORK

CONTROL SIGNAL REDUCTION FOR SCHEDULING POC
TRAFFIC VIA CELL MULTICASTING

FLOW CHART OF RADIO RESOURCE EFFICIENT
TRANSMISSION FOR POC IN LTE NETWORK

EARLY TERMINATION OF PoC MULTICAST TRAFFIC

POC MULTICAST SERVICE CONTINUITY

POC MULTICAST TRAFFIC SERVICE CONTINUITY

IDLE MODE RECEPTION FOR POC TRAFFIC

IDEL MODE RECEPTION FOR POC TRAFFIC

IDLE MODE RECEPTION FOR POC TRAFFIC

GROUP COMMUNICATION OVER LTE EMBMS

CROSS REFERENCE TO RELATED APPLICATIONS

This application claims priority under 35 U.S.C. §119 from U.S. Provisional Application No. 61/804,392, entitled "Method for Handover Robustness for PoC DL Traffic Multicasting", filed on Mar. 22, 2013; U.S. Provisional Application No. 61/804,398, entitled "Method for RRC_Idle Mode Reception for PoC DL Traffic Multicasting", filed on Mar. 22, 2013; U.S. Provisional Application No. 61/804,402, entitled "Method for Radio Resource-Efficient Transmission of PoC DL Traffic", filed on Mar. 22, 2013; U.S. Provisional Application No. 61/804,405, entitled "Method for Supporting PoC DL Traffic Multicasting", filed on Mar. 22, 2013, the subject matter of which is incorporated herein by reference.

TECHNICAL FIELD

The disclosed embodiments relate to group communication over LTE evolved Multimedia Broadcast and Multicast Service (eMBMS).

BACKGROUND

A Long-Term Evolution (LTE) system offers high peak data rates, low latency, improved system capacity, and low operating cost resulting from simple network architecture. An LTE system also provides seamless integration to older wireless networks, such as Global System for Mobile Communications (GSM), Code Division Multiple Access (CDMA), and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipments (UEs). Over the years, enhancements to LTE systems are considered by the third Generation Partnership Project (3GPP) so that an LTE Advanced (LTE-A) system can meet or exceed International Mobile Telecommunications Advanced (IMT-Advanced) fourth generation (4G) standard.

Multimedia Broadcast and Multicast Service (MBMS) is a broadcasting service offered via existing GSM and UMTS cellular networks. Recently, evolved MBMS (e-MBMS) has been introduced in the LTE specification for broadcasting or multicasting TV, films, and other information such as overnight transmission of newspapers in a digital form. To facilitate MBMS in LTE systems, a multicast control channel (MCCH) is used for the transmission of MBMS control information in each MBMS Single Frequency Network (MBSFN) area, and a multicast traffic channel (MTCH) is used for the transmission of user traffic to UEs receiving MBMS data packets. MBMS has the major benefit that the network infrastructure already exists for mobile network operators and that deployment can be cost effective compared with building a new network for the service. The broadcast capability enables to reach unlimited number of users with constant network load. The broadcast capability also enables the possibility to broadcast information simultaneously to many cellular subscribers, such as emergency alerts.

Push-to-talk (PTT) is a type of group communication method of having conversations or talking on half-duplex communication lines, including two-way radio, using a momentary button to switch from voice reception mode to transmit mode. Push to Talk over Cellular (PoC) is a service option for a cellular network to offer mobile subscribers a walkie-talkie type of group communication with unlimited range. A significant advantage of PoC/PTT is the ability for a single mobile user to reach an active talk group with a single button press. The mobile user needs not to make several telephone calls to coordinate the communication group. PoC/PTT has been commonly based on 2.5G or 3G packet-switched networks and uses, for example, SIP and RTP/RTCP protocols. The Open Mobile Alliance (OMA) PoC specifies a PoC server for user management to enable PoC, based on VoIP and relied on IP multimedia Subsystem (IMS) as a service enabler.

PoC downlink (DL) traffic can be very bursty. In case of a group call, one talks and multiple users listen. Current PoC service realizes one-to-many communication via multi-unicasting. The traffic from one speaker is duplicated for the same number of times as the number of total recipients, i.e., many DL transmissions in response to one UL transmission. For large group size, bursty traffic can cause congestion in the core network. If the number of UEs of a group residing in a cell is big, then bursty traffic can cause network capacity to drop. Furthermore, the current SIP-based PoC service requires long call setup time. With SIP compression, call setup delay can be reduced to ~1-2 s level. However, such setup delay is still longer than the <300 ms level recommended for public safety applications.

Therefore, it is beneficial to have more efficient data distribution scheme to ease the loading in the core network, and to have more efficient resource utilization to ease the bursty requirement of radio resource. PoC DL traffic multicasting is used to indicate the general idea of multicast distribution of the PoC DL traffic in the core network, in RAN, or in both the core network and RAN. With PoC DL traffic multicasting, mulitiple UEs can receive PoC DL traffic from the same physical transmission. Within the core network, the same packet is addressed to multiple eNBs via multicast address (PoC DL traffic multicasting in the core network). For efficient radio transmission, multiple UEs can monitor the same DL assignment in RAN (PoC DL traffic multicasting in RAN). It is also beneficial to enable idle mode PoC DL traffic reception from power saving and call setup latency perspectives.

Another important feature of a mobile wireless system such as LTE is the support for seamless mobility across eNBs and the entire network. Fast and seamless handover (HO) is particularly important for delay-sensitive services such as PoC. For traffic multicasting, PoC group mobility management is required in the core network so that PoC packet can be properly routed to relevant eNBs. For example, UE position to the granularity of cell is required. Otherwise, PoC multicast bearer cannot be handed over to a new target cell.

In the present invention, it is proposed to utilize MBMS in LTE/LTE-A systems to support PoC DL traffic multicasting, to enable efficient radio resource transmission, to reduce call setup latency via idle mode reception, and to provide PoC group mobility management to maintain PoC service continuity.

SUMMARY

A method of supporting group communication over LTE MBMS is provided. A UE first establishes a unicast Evolved Packet Service (EPS) bearer in an LTE network for group communication. The UE belongs to a communication group having a communication group ID. The UE receives access information from the network for monitoring downlink (DL) multicast traffic of the DL group communication based on a multicast decision. The UE is then ready for monitoring a multicast Multimedia Broadcast Multicast Service (MBMS) bearer for receiving the DL multicast traffic. The multicast MBMS bearer is associated with a Temporary Mobile Group Identifier (TMGI), and wherein the TMGI is associated with the communication group ID. In one embodiment, the access information comprises mapping information between the TMGI and the communication group ID.

In a first novel aspect, PoC traffic multicasting is supported to multicast distribution of the POC DL traffic in the core network, in RAN, or in both the core network and RAN. With PoC DL traffic multicasting, a UE can receive PoC DL traffic from the same physical transmission. Within the core network, the same packet can be addressed to multiple eNBs via a multicast address. For radio transmission, multiple UEs are enabled to monitor the same DL assignment in RAN level.

In a second novel aspect, more efficient radio resource utilization can be achieved by PoC DL traffic multicasting in RAN level. Radio resource efficient transmission of PoC DL traffic can be achieved by sharing radio resources using cell-broadcasting scheme or in cell-multicasting scheme. Cell-broadcasting scheme refers to the use of MBSFN subframe exclusively for PoC DL traffic. Cell-multicasting scheme refers to the dynamic scheduling of PDSCH for multiple UEs by addressing a corresponding PDCCH to a group radio identifier. Furthermore, multiple PoC UEs can share the same PDCCH to reduce control channel loading for PoC DL traffic scheduling.

In a third novel aspect, long service interruption of PoC DL traffic multicasting during handover is avoided. In one embodiment, a smaller PoC DL multicasting radio coverage is applied for early termination of multicast distribution at cell edge. Furthermore, PoC service continuity is maintained by selecting proper target cell in handover case. In one embodiment, a UE sends an indication of preferred target cells to the network before performing a handover procedure and thereby maintaining multicast service continuity of PoC service.

In a fourth novel aspect, RRC_IDLE mode reception is supported for PoC DL traffic delivery. PoC DL traffic is delivered via EPS MBMS service in the core network using MBMS broadcasting mode. PoC UEs in RRC_IDLE mode are configured to monitor PoC traffic on MBMS bearers for power saving and reduced call setup latency. Cell broadcasting using LTE MBSM radio transmission and cell multicasting using LTE dynamic scheduling radio transmission may be used for RRC_IDLE mode reception.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
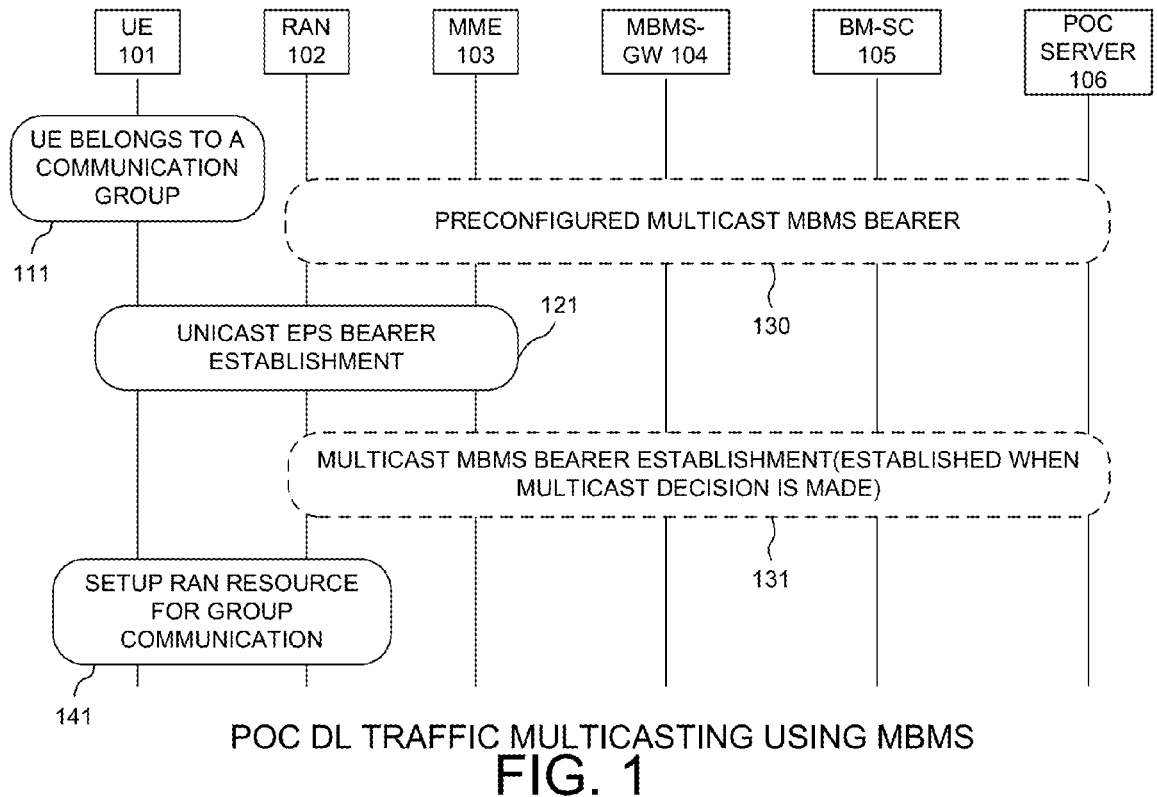
FIG. 1 illustrates a procedure of supporting group communication using MBMS in an LTE network in accordance with one novel aspect.

FIG. 1 illustrates a procedure of supporting group communication using Evolved Multimedia Broadcast and Multicast Service (e-MBMS) service in a mobile cellular communication network in accordance with one novel aspect. The network comprises a user equipment UE 101, a radio access network RAN 102 comprising a plurality of eNBs, a mobility management entity MME 103, an MBMS gateway (MBMS- GW) 104, a Broadcast Multicast Service Center (BM-SC) 105, and a Push to Talk over Cellular (PoC) server 106. PoC is a type of group communication service that provides the ability for a single mobile user to reach an active talk group with a single button press. In the following discussion, PoC service is used as an example representing for group communication, and other types of group communication applications, such as data exchange, video sharing, etc. are applicable.

The Open Mobile Alliance (OMA) PoC specifies a PoC server for user management to enable PoC, based on VoIP and relied on IP multimedia Subsystem (IMS) as a service enabler. PoC users register with the IMS core before using the PoC service. During IMS registration, a UE binds its public user IDs (SIP address) to the IP address at registration, and IMS uses the information for routing the voice call. In OMA IMS-based PoC, Session Initiation Protocol (SIP) is used as a signaling protocol for PoC session setup, Real Time Transport Protocol (RTP) is used for voice data transfer, and RTP Control Protocol (RTCP) is used for floor control.

Multimedia Broadcast and Multicast Service (MBMS) is a broadcasting service offered for broadcasting or multicasting information in digital form. By design, MBMS service in LTE is integrated with the IMS service based on SIP, similar to PoC service. In MBMS, the BM-SC provides functions for MBMS content provider for MBMS user service provisioning and delivery. As a result, OMA PoC can reuse the functions for PoC traffic delivery. MBMS provides two modes for content distribution. In MBMS broadcast mode, content is delivered to UEs within a predefined area (e.g., Multicast-Broadcast Single-Frequency Network (MBSFN) area). Neither subscription service nor UE mobility management is provided. In EPS, multicast distribution from BM-SC to eNBs is supported by multicast address. In MBMS multicast mode, content is delivered to specific UEs. UE subscription and UE mobility management is required. Multicast distribution from BM-SC to subscribed UEs is supported by multicast address, and routing within the core network can be achieved by unicast distribution. In general, MBMS bearer should be reused for PoC DL traffic multicasting for applying common security among members in a communication group. MBMS data is encrypted in higher layer, but not in RAN, and unicast bearers are encrypted for individual UEs. Currently, EPS supports MBMS broadcast mode only, while GPRS supports both MBMS broadcast and multicast mode.

In accordance with one novel aspect, PoC DL traffic multicasting is supported for the multicast distribution of PoC DL traffic in the core network and/or in RAN for efficient radio usage. From UE perspective, to support PoC traffic multicasting, two bearers are established for each individual UE. As illustrated in FIG. 1, in step 111, UE 101 joins a communication group. For example, UE 101 is interested in PoC service and joins a PoC group. The PoC groups can be semi-statically formed by a central controller in advance, or distributely formed by UEs via a user interface. Each PoC group is assigned with a PoC group ID. In step 121, UE 101 establishes a unicast EPS bearer for group communication. The unicast bearer is at least for UL group communication. For example, UE 101 may indicates its group communication interest when requesting the unicast bearer, and acquires a Temporary Mobile Group Identifier (TMGI) associated with a multicast MBMS bearer for receiving group traffic. In step 131, the multicast MBMS bearer is established when the PoC server or the BM-SC makes a multicast decision for the group communication. The multicast bearer, when appropriate, is used for DL group communication. Alternatively, the MBMS bearer is pre-configured. As depicted in step 130, the pre-configured MBMS bearer occurs before the unicast bearer establishment in step 121. In step 141, UE 101 applies MBMS bearer configuration and sets up RAN resource for receiving DL group communication traffic.

Figure 2:
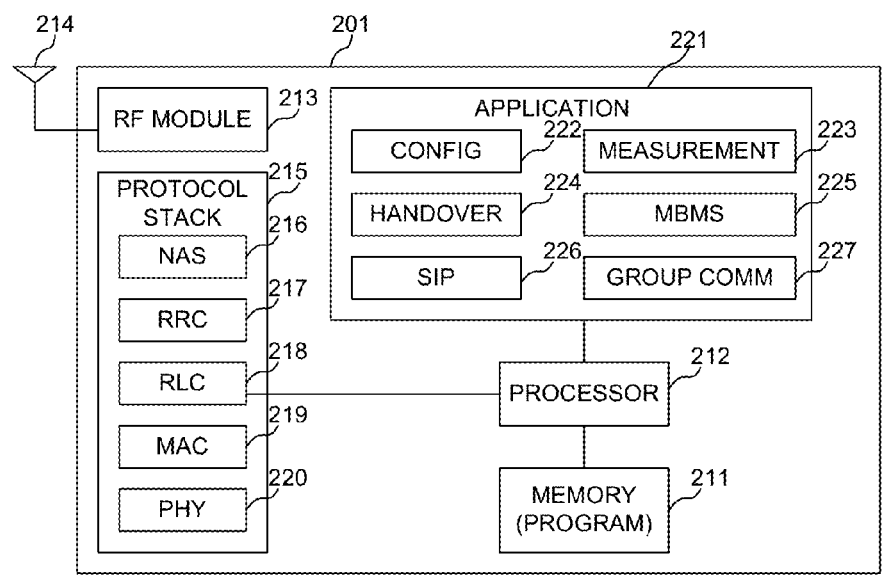
FIG. 2 is a simplified block diagram of a user equipment in accordance with one novel aspect.

FIG. 2 is a simplified block diagram of a user equipment UE 201 in accordance with one novel aspect. UE 201 comprises memory 211, a processor 212, a radio frequency (RF) module 213 coupled to antenna 214, a protocol stack module 215 supporting various protocol layers including NAS 216, RRC 217, RLC 218, MAC 219 and PHY 220, and an application layer 221 including a configuration module 222, a measurement module 223, a handover module 224, an MBMS control module 225, a SIP module 226, and a group communication module 227. The various modules are function modules and may be implemented by software, firmware, hardware, or any combination thereof. The function modules, when executed by processor 212, interwork with each other to allow UE 201 to perform various functionalities accordingly.

For example, configuration module 222 applies configuration information received from the network (e.g., for EPS bearer and MBMS bearer configuration) to establish unicast and multicast bearers, measurement module 223 performs radio signal measurements and reporting, HO module 224 performs handover or cell reselection procedure for UE mobility, MBMS control module 225 reports MBMS capability and reception/interest status to the network to support for making multicast decision and for maintaining MBMS service continuity with less MBMS service interruption. SIP module 226 applies the standard SIP signaling protocol to setup session for group communication service. Group communication module 227 monitors a multicast MBMS bearer for receiving DL group traffic and de-multiplexes the DL traffic received either from the multicast MBMS bearer or from the unicast EPS bearer into the same group communication application.

In accordance with one novel aspect, PoC traffic multicasting is supported to multicast distribution of the POC DL traffic in the core network, in RAN, or in both. With PoC DL traffic multicasting, multiple UEs can receive PoC DL traffic from the same physical transmission. Within the core network, the same packet can be addressed to multiple eNBs via a multicast address. For radio transmission, multiple UEs are enabled to monitor the same DL assignment in RAN level. For PoC traffic multicasting, a mobility management entity needs to track the position of relevant UEs, i.e., mobility management for PoC group UEs. The core network needs to know UE positions (e.g., to the granularity of cell) so that the PoC DL traffic can be routed to the eNBs where the UE resides. The mobility management entity needs to know the PoC UE count for deciding radio unicast or multicast.

The support of PoC traffic multicasting and PoC group mobility management can be achieved using different MBMS delivery modes and management entities. In a first scheme, group mobility management is based on OMA PoC server, and traffic delivery in EPC is based on MBMS broadcast mode (BM) for efficient resource usage. Since MBMS BM is already supported in EPS, this scheme minimizes changes to EPC. In a second scheme, group mobility management is in the core network and traffic delivery in EPC is based on MBMS multicast mode (MM) for efficient resource usage. Although MBMS MM is only supported in GPRS (not supported in EPS currently), this scheme is more sensible because mobility support is in the core network. Different schemes are now described below with details and accompanying drawings.

Group Mobility Support for PoC DL Multicast

Figure 3:
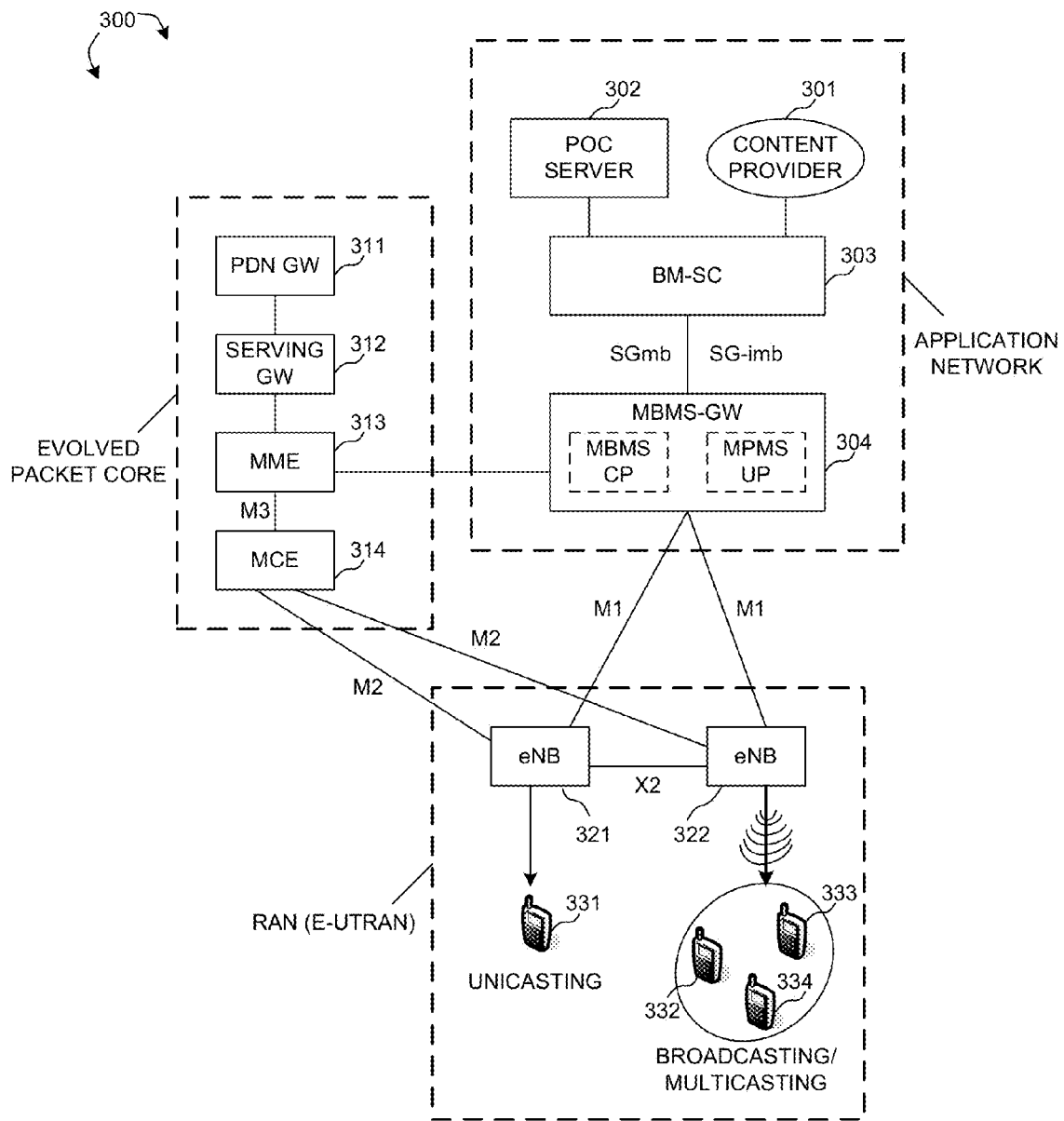
FIG. 3 illustrates an architecture of an LTE system supporting group communication via MBMS broadcasting mode and using PoC server for group mobility management in accordance with one novel aspect.

FIG. 3 illustrates an architecture of an LTE system 300 supporting group communication via MBMS broadcasting mode and using PoC server for group mobility management in accordance with one novel aspect. LTE system 300 comprises an application network, an evolved packet core (EPC) network, and a radio access network (RAN). The application network comprises a content provider 301, a PoC server 302, a Broadcast Multicast Service Center (BM-SC) 303, and an MBMS gateway (MBMS-GW) 304 for MBMS control plane and user plane (CP&UP). The EPC network comprises a packet data network gateway (PDN-GW) 311, a serving gateway (S-GW) 312, a mobility management entity (MME) 313, and a multi-cell/multicast coordination entity (MCE) 314. The radio access network, for example, is an E-UTRAN that comprises two evolved Node-Bs eNB 321 and eNB 322, and a plurality of user equipments UEs 331-334. In the example of FIG. 3, UE 331 is served by eNB 321, and UEs 332-334 are served by eNB 322.

In MBMS broadcast mode, BM-SC 303 is an entry point for content provider for MBMS transmissions. BM-SC 303 can use either MBMS bearer or EPS bearer to broadcast MBMS packets to eNB transmitting a corresponding MBMS service. In case of EPS bearer, MBMS services follow normal unicast route. In case of MBMS bearer, MBMS services go through MBMS-GW 304. MBMS-GW 304 is a logical entity that may be standalone or co-located with BM-SC/S-GW/PDN-GW. MBMS-GW 304 provides MBMS bearer reference point for Control Plane (CP) and User Plane (UP) (i.e., SGmb and SG-imb). U-plane is through M1 to eNBs for IP multicast distribution within a single PLMN. C-plane is supported by MME 314 for EUTRAN access. MBMS bearer session control for accessing EUTRAN is supported by MME 313. IP multicast address is allocated to eNBs through MME 313 and the multicast group is provided by BM-SC 303. MCE 314 provides session management signaling, and coordinates radio resource configuration of eNBs in an MBMS Single Frequency Network (MBSFN) area, e.g., Physical resource blocks (PRBs) and Modulation and coding scheme (MCS). MCE 314 is a logical entity, which can be standalone or be part of another network element such as inside an eNB.

When a UE (e.g., UE 331) receives a specific MBMS service, MBMS data packets (U-Plane) are transmitted from content provider 301, through BM-SC 303, through MBMS-GW 304, through eNB 321, and then to UE 331. On the other hand, MBMS control information (C-Plane) is communicated between PDN-GW 311 and UE 331 via MME 313, MCE 314 and eNB 321. As illustrated in FIG. 3, eNB 321 and eNB 322 are connected to MBMS-GW 304 via a pure user plane interface M1. In addition to the M1 interface, two control plane interfaces M2 and M3 are defined in LTE system 300. The application part on the M2 interface conveys radio configuration information between the eNBs and MCE 314, and the application part on the M3 interface performs MBMS session control signaling on MBMS bearer level between MCE 314 and MME 313.

In accordance with one novel aspect, the EPS MBMS service is reused for broadcasting PoC DL traffic in selected cells. When using PoC server 302 as the entity for PoC group mobility management, PoC traffic is delivered in the core network via MBMS broadcast mode to minimize changes to the EPC. For each individual UE, two bearers are established. A first bearer is a unicast EPS bearer used at least for PoC UL traffic, and a second bearer is a multicast MBMS bearer, when appropriate, used for PoC DL traffic. The MBMS bearer can be established proactively (pre-configured) or reactively (dynamically). To support PoC traffic multicasting, the PoC server 302 makes multicast decision and decides the use of the MBMS bearer for a subset of a group of PoC UEs. For example, for big-enough intra-cell PoC group UEs, the MBMS bearer is used for PoC DL traffic.

Figure 4:
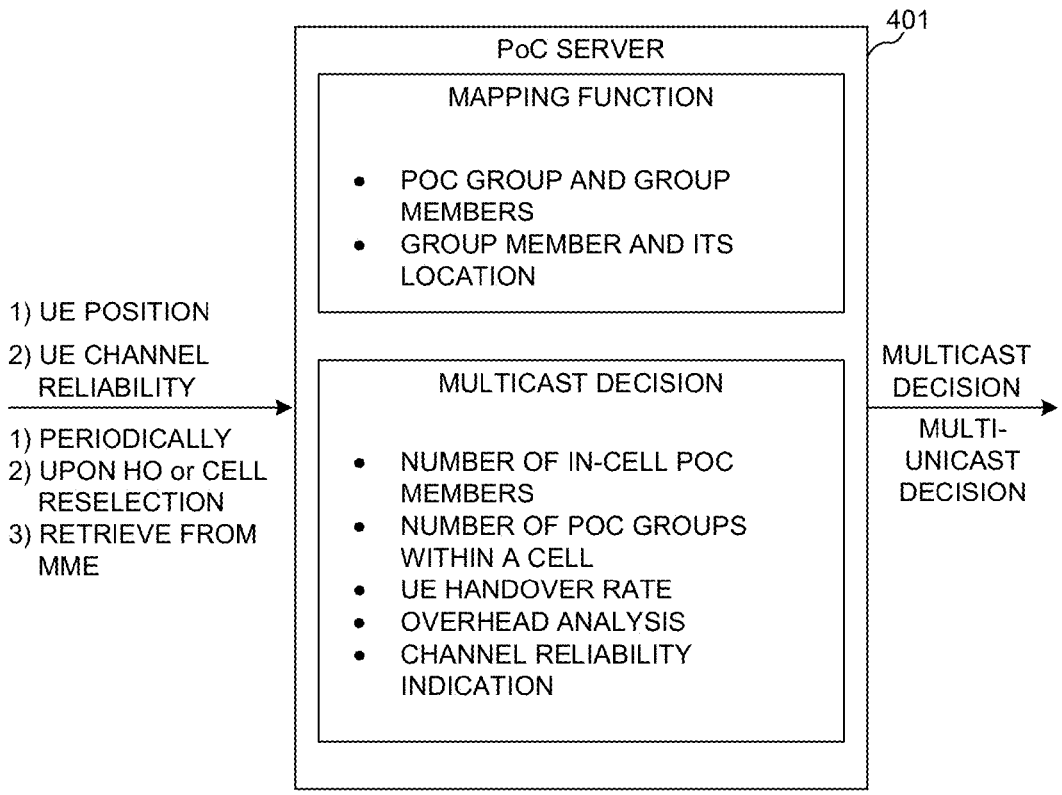
FIG. 4 illustrates a PoC server for PoC group mobility management and PoC multicast decision.

FIG. 4 illustrates a PoC server 401 for PoC group mobility management and for making multicast decision for PoC DL traffic. PoC group mobility management involves managing the location of PoC group UEs (to the granularity of cell) and managing the mobility status of PoC group UEs (e.g., handover rate). As illustrated in FIG. 4, the PoC server takes input of UE position information and UE channel reliability information to perform certain mapping function for group management. The UE position information and UE channel reliability information can be reported to the network periodically, or upon handover or cell reselection, or can be retrieved by the PoC server from MME. Based on the UE position, the PoC server is able to identify the corresponding PoC group and PoC group members and its location.

In one embodiment, multicast decision is made by a logical node, e.g., in the PoC server. The logical node can constantly/periodically examine all the factors and make decisions at various time resolution. The multicast decision is in general based on at least one of the following factors/criteria: the number of in-cell PoC group members, the number of PoC groups within a cell, UE mobility (handover rate) information, overhead analysis (based on ROHC, repetitive transmission scheme, and limited MCS selection), and the channel reliability indication. Channel reliability information comprises, for example, packet loss rate. It indicates the fitness for multicasting. The channel reliability indication thus can be used to remove or to include certain in-cell PoC UEs out or into an existing multicast group. For example, if the packet loss rate of a UE is high, then the PoC server can terminate multicasting traffic for that UE. The channel reliability indication also indicates that the design of radio parameters does not need to assume cell border. UE can terminate the multicast bearer for PoC multicasting before handover if UE mobility tracking is not supported in the core network.

Figure 5:
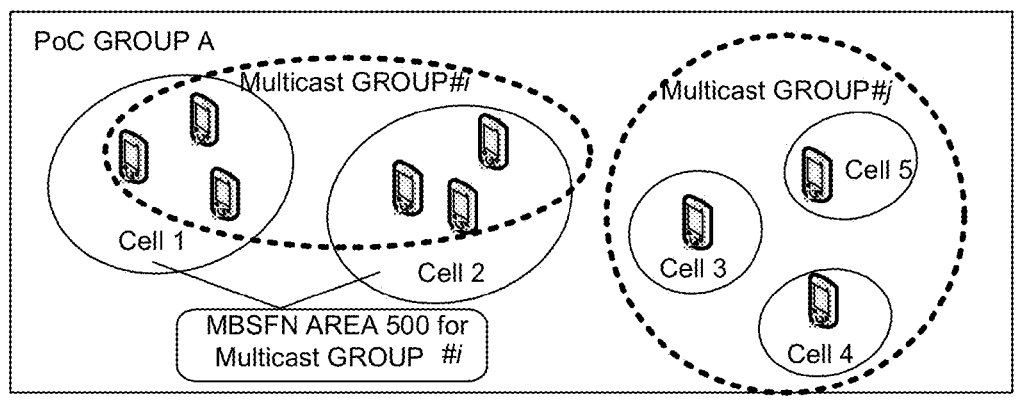
FIG. 5 illustrates a PoC server making multicast decision for PoC traffic.

FIG. 5 illustrates a PoC server making multicast decision for PoC DL multicast traffic. A multicast group is defined as a subset of PoC UEs from the same PoC group for PoC traffic multicasting. Multicast decision is made for the subset of PoC UEs within the PoC group. As illustrated in FIG. 5, a PoC group A consists of PoC UEs in cells 1-5, and a multicast group #i consists of PoC UEs in cells 1-2. Based on the multicast group, the relevant PoC traffic is delivered to the relevant eNBs based on MBMS service. The delivery to the relevant eNBs can be realized in a multi-unicast or multicast manner. The multicast or multi-unicast decision can be further optimized. For example, multicast group #i can consist of PoC UE clusters from different eNBs (e.g., cell 1 and cell 2), and in-cell PoC UEs in a large PoC group can be clustered into different multicast groups.

An MBSFN area (e.g., MBSFN area 500) can be used to define relevant eNBs corresponding to the multicast group (e.g., group #i). For example, an MBSFN area can be used to differentiate different multicast groups if their geographical coverage areas are not the same. However, if multiple PoC groups whose geographical coverage is the same, then different multicast groups of those PoC groups can be differentiated by TMGI while they share the same MBSFN area ID. Typically, one MBSFN area corresponds to one multicast group and one MBSFN consists of only one cell/eNB. For large PoC groups, however, it is possible to have a few eNBs in an MBSFN area. Currently, the MBSFN area ID are only 0-255, which is not enough. It is proposed that the MBSFN area ID is extended to support more multicast groups. Alternatively, the MBSFN area ID can be managed dynamically, but this is in conflict with the current O&M principles.

In addition to UE position information and UE channel reliability information, UE MBMS capability information and UE MBMS reception status information can also be used to assist PoC group mobility management and multicast decision.

Figure 6:
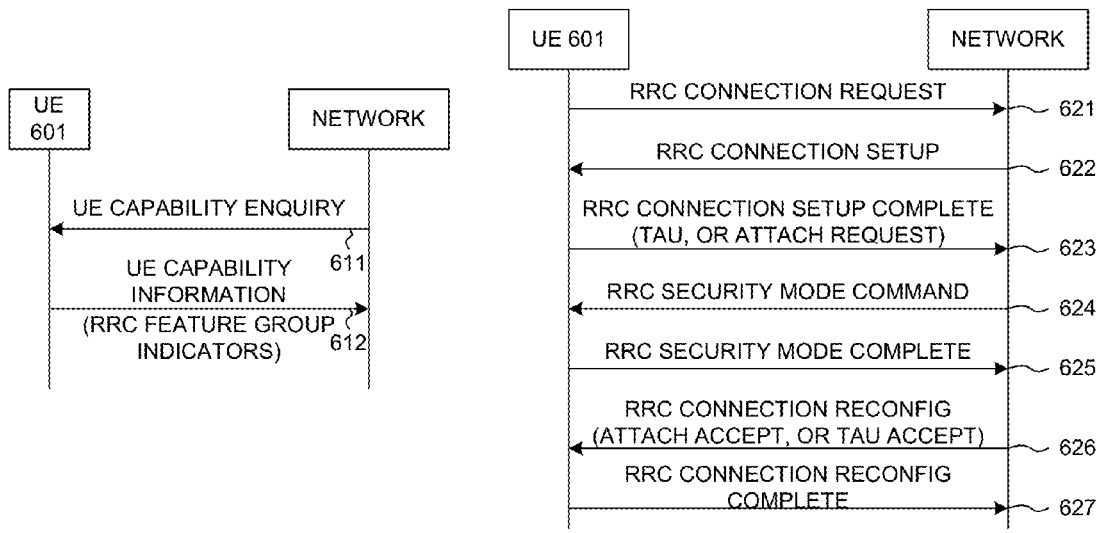
FIG. 6 illustrates different embodiments of UE reporting MBMS capability to the network.

FIG. 6 illustrates different embodiments of UE reporting MBMS capability to the network. In a first embodiment illustrated in the left half of FIG. 6, in step 611, UE 601 receives UE capability enquiry from the network. In step 612, UE 601 transmits UE capability information to the network. The UE capability information comprises an RRC feature group indicator, indicating the MBMS capability supported by the UE. In a second embodiment illustrated in the right half of FIG. 6, MBMS capability is reported in EMM (EPS Mobility Management) message. In step 621, UE 601 transmits an RRC connection request to the network. In step 622, UE 601 receives an RRC connection setup from the network. In step 623, UE 601 transmits an RRC setup complete message to the network. The RRC setup complete message may contain an Attach Request message or a Tracking Area Update (TAU) message sent to the NAS entity. The Attach message or the TAU message is used to indicate MBMS capability. In step 624, UE 601 receives an RRC security mode command from the network. In step 625, UE 601 sends an RRC security mode complete message to the network. In step 626, UE 601 receives an RRC connection reconfiguration message from the network, which contains an Attach Accept or TAU Accept message. Finally, in step 627, UE 601 sends another RRC Connection Reconfiguration Complete message to the network. In a third embodiment, the MBMS capability information is indicated through application layer messages as illustrated below in FIG. 9.

Figure 7:
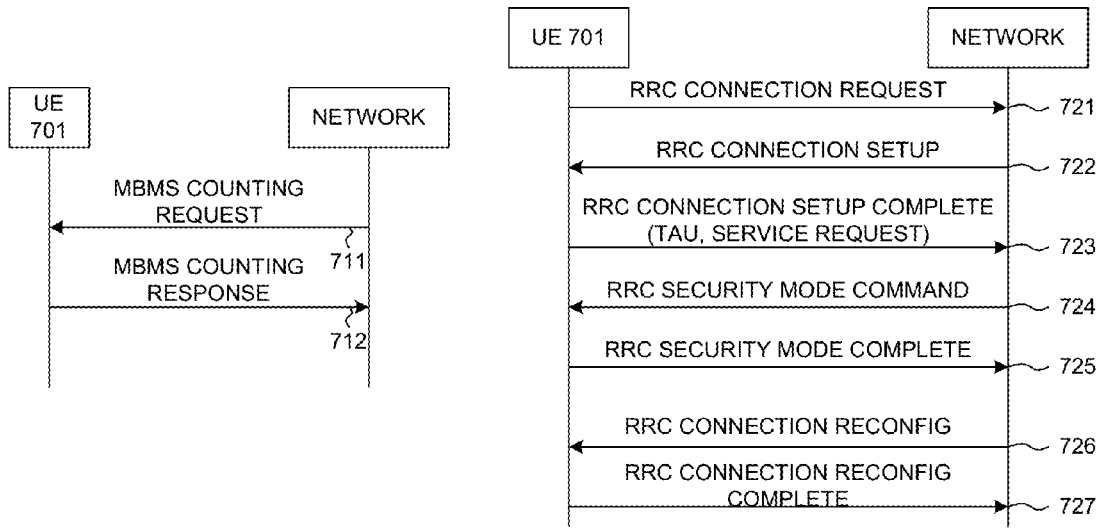
FIG. 7 illustrates different embodiments of UE reporting MBMS reception status to the network.

FIG. 7 illustrates different embodiments of UE reporting MBMS reception status to the network. In a first embodiment illustrated in the left half of FIG. 7, in step 711, UE 701 receives an MBMS counting request from the network. In step 712, UE 701 transmits MBMS counting response to the network. The MBMS counting is to count the number of UEs interested in certain MBMS services within an MBSFN area, i.e., one counting for one MBMS service for one MBSFN area. As a result, the selection of EPS or MBMS bearer can be based on the counting. The selection of EPS or MBMS bearer is directly coupled with the selection of point-to-point or point-to-multipoint radio bearer. In a second embodiment illustrated in the right half of FIG. 7, MBMS reception or interest status is reported in RRC or EMM messaging. In step 721, UE 701 transmits an RRC connection request to the network. In step 722, UE 701 receives an RRC connection setup from the network. In step 723, UE 701 transmits an RRC setup complete message to the network. The RRC setup complete message may be used to carry MBMS reception status. In addition, the RRC setup complete message may contain a TAU message or a service request used to carry MBMS reception/interest status. In step 724, UE 701 receives an RRC security mode command from the network. In step 725, UE 701 sends an RRC security mode complete message to the network. In step 726, UE 701 receives an RRC connection reconfiguration message from the network. Finally, in step 727, UE 701 sends another RRC Connection Reconfiguration Complete message to the network. In a third embodiment, the MBMS reception status is indicated through application layer messages as illustrated below in FIG. 9.

To support PoC traffic multicasting, both a unicast EPS bearer and a multicast MBMS bearer need to be already established for the same service before a UE requests for PoC traffic. The unicast EPS bearer is established at least for PoC UL traffic. The multicast MBMS bearer, when appropriate, is used for PoC DL traffic. The selection of the EPS bearer and the MBMS bearer is decided by the BM-SC based on MBMS counting. From UE perspective, UE shall perform the EPS bearer and the MBMS bearer association. UE shall receive data from both bearers and route the data from the multicast bearer and the unicast bearer to the same application. The UE shall perform duplicate detection for the data over the multicast MBMS bearer and the unicast EPS bearer. For example, if the same data (e.g., same sequence number) is sent from both bearers, UE shall regard them as duplication. UE shall not automatically disconnect any of the bearers (radio part of the bearers) when both bearers are receiving data. UE shall not request bearer reestablishment if the unicast bearer is disconnected by the network and the MBMS bearer can still receive data, unless the MBMS bearer is approaching MBMS coverage hole or MBMS coverage boundary.

Figure 8:
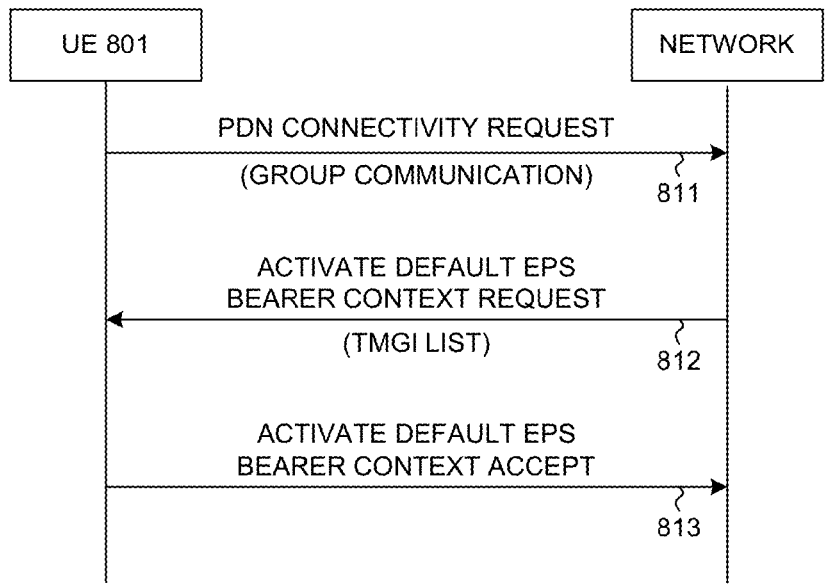
FIG. 8 illustrates one embodiment of establishing a unicast EPS bearer for UL PoC traffic.

FIG. 8 illustrates one embodiment of establishing a unicast EPS bearer for UL PoC traffic. In step 811, UE 801 sends a PDN connectivity request to the network for establishing the unicast EPS bearer. In general, a UE can indicate the group communication service interest directly when request setting up the unicast bearer. For example, the UE may use a pre-configured APN to request group communication service, and the APN may be configured in SIM, UE storage, or OMA-DM. In the example of FIG. 8, the PDN connectivity request indicates the interest of UE 801 for group communication service. In step 812, UE 801 receives a request from the network to activate default EPS bearer context. If there is a pre-configured MBMS bearer for the corresponding group communication service, then the network can simply assign required information for UE 801 to receive group traffic from the MBMS bearer. For example, a TMGI list of communication groups is assigned by the network when establishing the MBMS bearers and UE 801 acquires the TMGI from the TMGI list in step 812. In step 813, UE 801 sends an activate default EPS bearer context accept message back to the network.

Figure 9:
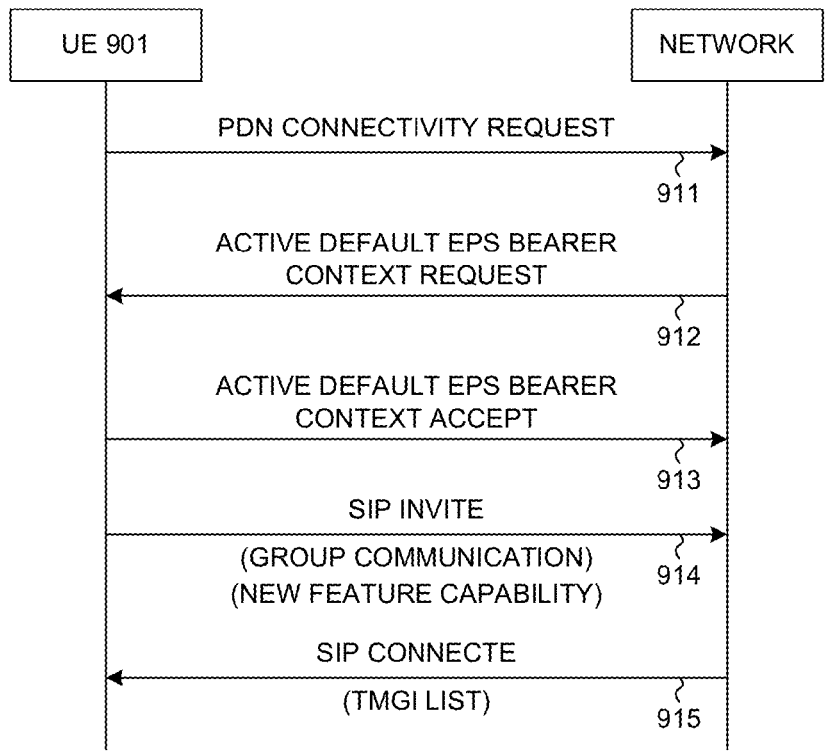
FIG. 9 illustrates another embodiment of establishing a unicast EPS bearer for UL PoC traffic.

FIG. 9 illustrates another embodiment of establishing a unicast EPS bearer for UL PoC traffic. In step 911, UE 901 sends a PDN connectivity request to the network for establishing the unicast EPS bearer. In step 912, UE 901 receives an activate default EPS bearer context request message from the network. In step 913, UE 901 sends an activate default EPS bearer context accept message back to the network. After the PDN connection setup is completed, UE 901 starts the SIP protocol for session setup. In step 914, UE 911 sends a SIP Invite to the network. In one example, the SIP Invite message may indicate group communication interest of UE 901. In step 915, UE 901 receives a SIP Connect from the network and acquires the TMGI from the SIP Connect message. In both embodiments of FIGS. 8 and 9, TMGI is acquired quickly and effectively for MBMS receiving. The application layer SIP protocol can also be used to report UE MBMS capability and MBMS reception status to the network. In the example of FIG. 9, the SIP Invite message may contain a New Feature Capability field, which carries UE MBMS capability information as well as MBMS reception status or interest information. In one advantageous aspect, once a PoC session is established using SIP, then it should not be terminated due to long inactivity/silence in the media Path. To avoid long call setup time for PoC traffic, such "long-live" SIP session can only be terminated by sending an explicit SIP BYE request message by any one of the communicating peers.

The MBMS bearer can be established proactively (pre-configured) or reactively (dynamically). For proactive establishment, MBMS multicast group for a PoC group is established beforehand, and PoC DL traffic is delivered through a corresponding pre-configured MBMS bearer. The pre-configured MBMS bearer is statically established without considering UE mobility information. For reactive establishment, MBMS multicast group for a subset of PoC group is established when a multicast decision is made after identified radio multicast/broadcast opportunity. In one example, a PoC group UE could belong to a PoC group but in deactivated state and has no interest in monitoring PoC traffic. When the UE decides to monitor the PoC traffic, it triggers the multicast decision process, and the MBMS bearer is established for the group UEs that are interested in monitoring PoC group traffic.

Figure 10A:
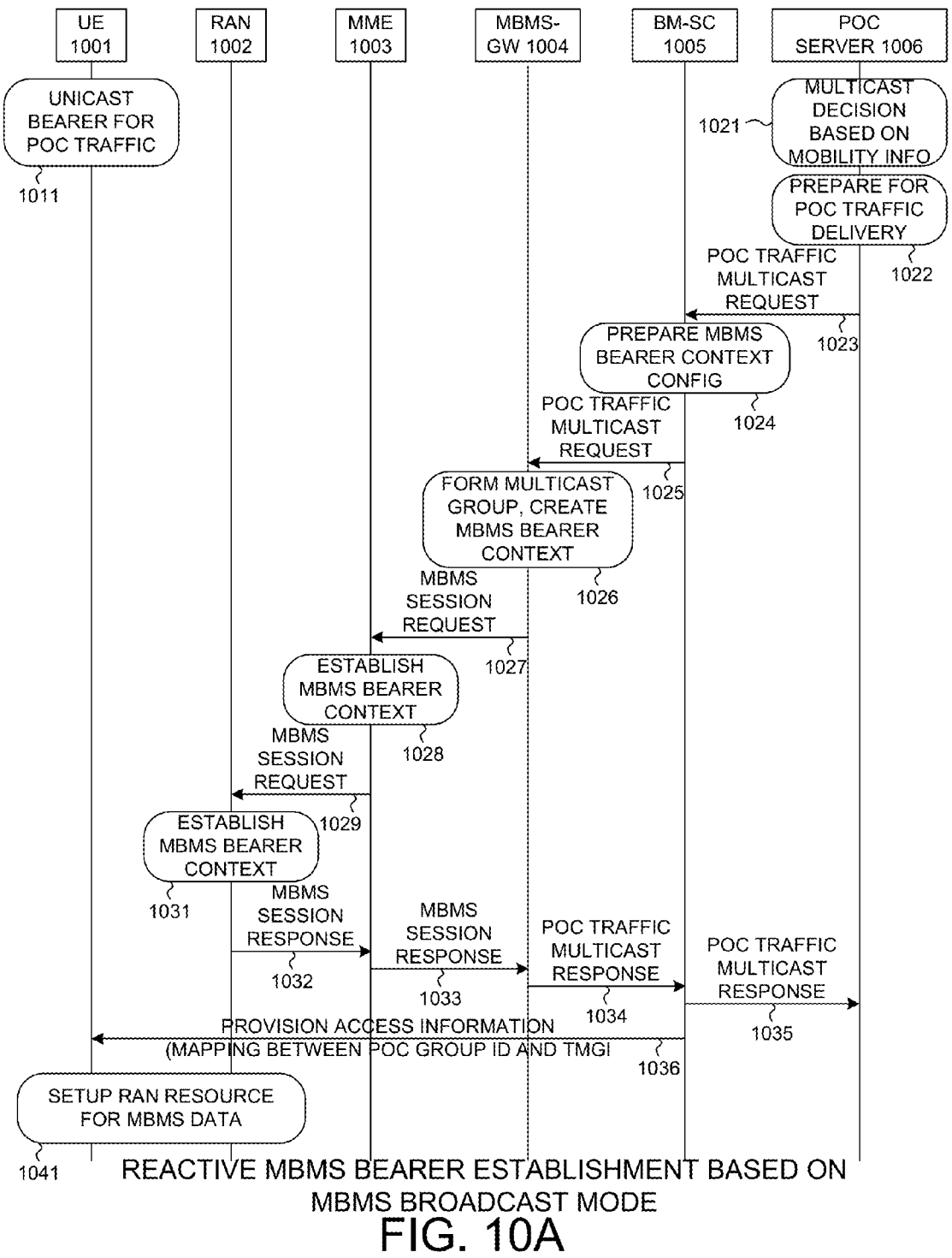
FIG. 10A illustrates one embodiment of reactive MBMS bearer establishment for PoC DL multicast traffic based on MBMS broadcast mode.

FIG. 10A illustrates one embodiment of reactive MBMS bearer establishment for PoC DL multicast traffic based on MBMS broadcast mode. In this embodiment, PoC server 1006 provides PoC group mobility management, i.e., maintaining PoC UE positions. For example, PoC UE 1001 belongs to a PoC group having a PoC group ID and regularly reports its position in data plane. PoC UE 1001 has one unicast bearer/connection established for PoC DL and UL traffic (step 1011). In step 1021, the PoC server makes multicast decision for a subset of PoC UEs based on factors shown in FIG. 4. In step 1022, the PoC server triggers BM-SC 1005 to activate PoC multicast for the subset of PoC UE, and informs BM-SC downstream nodes for traffic delivery by sending a PoC traffic multicast request (step 1023). In step 1024, the BM-SC initiates MBMS bearer resources for the traffic multicast. In step 1025, an MBMS bearer context configuration is passed from the BM-SC to MBMS-GW 1004 by sending another PoC traffic multicast request. Information of downstream nodes for traffic delivery is passed to the MBMS-GW as well. In step 1026, the MBMS-GW creates an MBMS bearer context according to the BM-SC configuration. The MBMS-GW forms a distribution tree of relevant eNBs (the ones with the subset of UEs) for traffic received from the BM-SC, based on the information from the BM-SC. The delivery between the BM-SC and eNBs can be achieved via multiple unicast connections or via a multicast connection. The relevant eNBs corresponding to the UE subset can be defined via an MBSFN area. In step 1027, MME 1003 receives a session request and creates an MBMS bearer context according to the BM-SC configuration (step 1028). In step 1029, the relevant eNBs in RAN 1002 receive the session request and create the MBMS bearer context as well (step 1031). If BM-SC to eNB routing is achieved via backbone multicasting, an IP multicast address is also delivered to the eNBs.

From steps 1032 to 1035, MBMS session response and PoC traffic multicast response are sent back from the eNBs, to MME, to MBMS-GW, to BM-SC, and to the PoC server. In step 1036, access information required for PoC traffic multicasting is announced to UE 1001 from BM-SC 1005. The access information comprises mapping information between the PoC group ID and the TMGI associated with the MBMS bearer. In step 1041, UE 1001 sets up RAN resource for receiving MBMS data. The relevant eNBs allocate necessary radio resources for the transfer of MBMS data to the interested UEs. The MBMS session for the PoC DL traffic starts when the BM-SC is ready to send PoC traffic using the MBMS bearer service. The PoC server filters PoC DL packets for PoC UEs with multicast decision, and delivers only one packet to the multicast group. After receiving traffic from the MBMS bearer, the UE can indicate to the network that it is successfully receiving DL traffic from the MBMS bearer. In response, the PoC server can terminate PoC DL traffic from the unicast bearer. The unicast bearer is kept for UL only.

Note that TMGI is linked to PoC group ID as an identifier in RAN. TMGI is required for MBMS bearer services, because MBMS uses TMGI to uniquely identify an MBMS service within a PLMN. The linkage between TMGI and PoC group ID is made by the BM-SC. The PoC UEs should be informed of the linkage between TMGI and PoC group ID (as part of the access information). For example, the linkage may be provided by non-dedicated RRC signaling, i.e., system information broadcasting, by signaling in data plane, or by agreed mapping rule. The association between TMGI and PoC group ID is changed regularly for security. In a first example, the association is changed through application layer protocol (e.g., SIP UPDATE). In a second example, the association is changed through specific NAS message (e.g., ESM "MODIFY EPS BEARER CONTEXT REQUEST" message). Upon receiving a new association, the UE shall continue to monitor the old TMGI to receive the multicast traffic over a period until PoC traffic from the new TMGI can be successfully received.

Figure 10B:
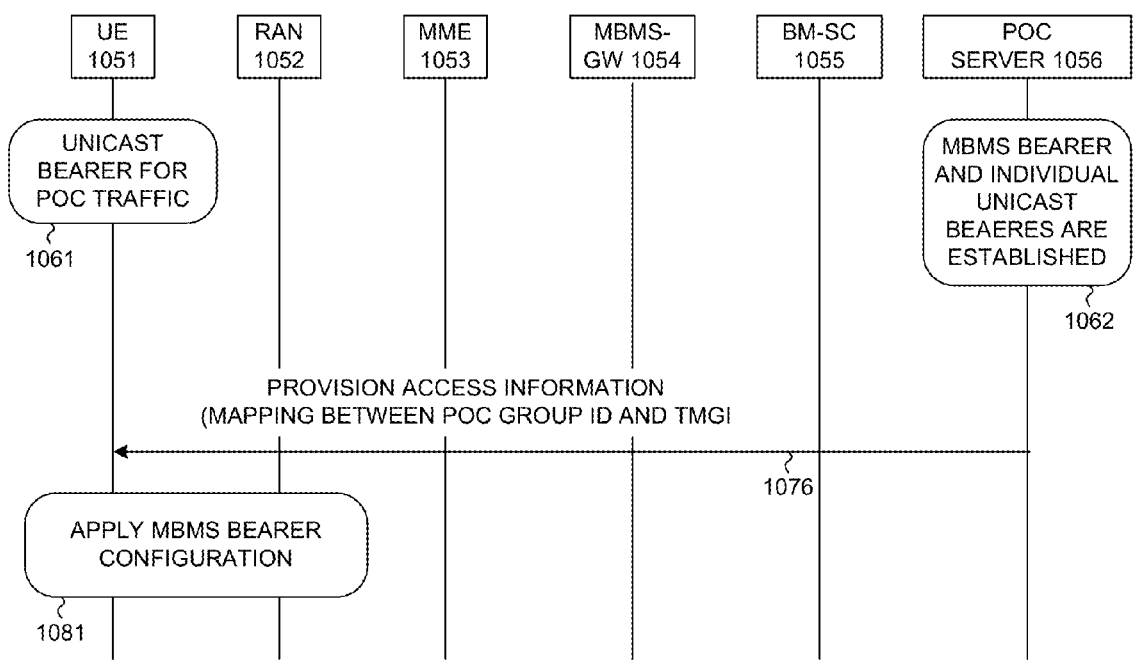
FIG. 10B illustrates one embodiment of proactive MBMS bearer establishment for PoC DL multicast traffic based on MBMS broadcast mode.

FIG. 10B illustrates one embodiment of proactive MBMS bearer establishment for PoC DL multicast traffic based on MBMS broadcast mode. In this embodiment, MBMS multicast group for a PoC group is established beforehand, and PoC DL traffic delivery is through a corresponding MBMS bearer. Group UE mobility is no longer important because PoC traffic multicasting is performed anyway. Relevant eNBs allocates necessary radio resources for the transfer of MBMS data via the MBMS bearer. In step 1061, new UE 1051 has one unicast bearer/connection established for PoC DL and UL traffic. In step 1062, an MBMS bearer is established beforehand for PoC DL traffic for the PoC group, and individual unicast bearers are established for UL traffic of individual PoC group UEs. When the new UE 1051 becomes active in monitoring PoC traffic in step 1061, access information required for PoC traffic multicast is announced to UE 1051 by PoC server 1056 in step 1076. The access information comprises mapping information between the PoC group ID and the TMGI associated with the MBMS bearer. In step 1081, UE 1051 applies the MBMS bearer configuration for monitoring the MBMS bearer to receive PoC DL traffic. After successfully receiving PoC DL traffic from the MBMS bearer, PoC server 1056 can terminate PoC DL traffic from the unicast bearer.

While MBMS broadcast mode is supported in EPS, MBMS multicast mode is supported only in GPRS. MBMS multicast mode supports multicasting between BM-SC and subscribed UEs. The difference between the broadcast/multicast modes is the awareness of UE interest of certain MBMS services to the granularity of cell. For broadcast mode, MBMS counting is over MBSFN area. For multicast mode, MBMS counting is over cell. When MBMS multicast mode is used as a delivery system in the core network for PoC, PoC group management support is mainly provided in the MBMS-GW, which is used for group mobility management.

Figure 11:
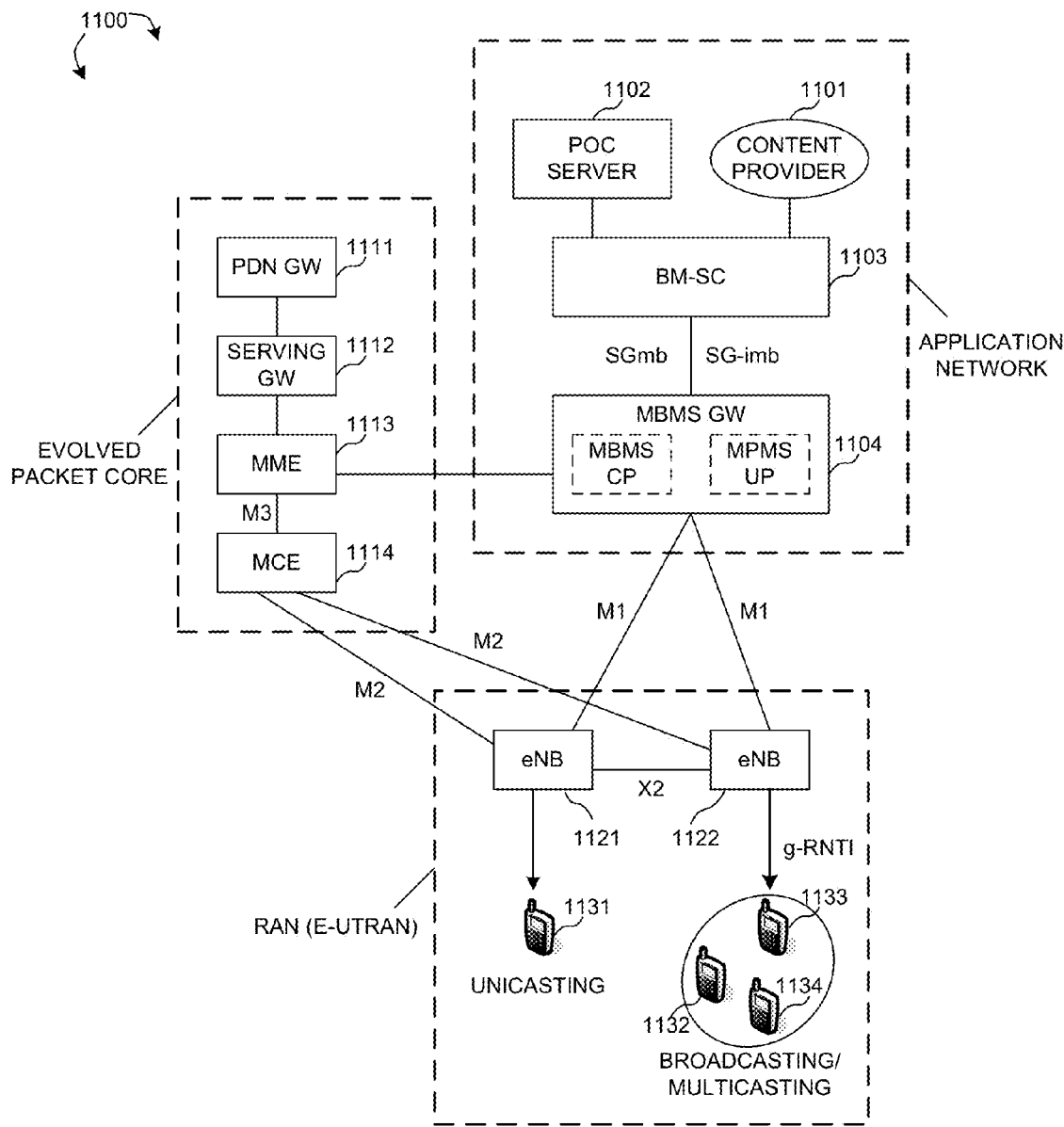
FIG. 11 illustrates an architecture of an LTE system supporting group communication via MBMS multicasting mode and using MBMS gateway for group mobility management in accordance with one novel aspect.

FIG. 11 illustrates an architecture of an LTE system 1100 supporting group communication via MBMS multicasting mode and using MBMS gateway for group mobility management in accordance with one novel aspect. Similar to LTE system 300 illustrated in FIG. 3, LTE system 1100 comprises an application network, an evolved packet core (EPC) network, and a radio access network (RAN). The application network comprises a content provider 1101, a PoC server 1102, a Broadcast Multicast Service Center (BM-SC) 1103, and an MBMS gateway (MBMS-GW) 1104 for MBMS control plane and user plane (CP&UP). The EPC network comprises a packet data network gateway (PDN-GW) 1111, a serving gateway (S-GW) 1112, a mobility management entity (MME) 1113, and a multi-cell/multicast coordination entity (MCE) 1114. The radio access network, for example, is an E-UTRAN that comprises eNB 1121 and eNB 1122, and a plurality of user equipments UEs 1131-1134. In the example of FIG. 11, UE 1131 is served by eNB 1121, and UEs 1132-1134 are served by eNB 1122.

In accordance with one novel aspect, MBMS multicast mode is applied for PoC DL traffic multicasting in selected cells in EPS. A multicast group consists of multiple UEs and is maintained at the MBMS-GW, which routes MBMS traffic to relevant eNBs with interested UEs. While the PoC server maintains the list of all PoC groups, the MBMS-GW also maintains mobility of PoC groups or the mobility of a set of PoC groups instructed by the PoC server. Mobility tracking is via the assistance of MME. In MBMS multicast mode, multicast decision can be made by the BM-SC, which examines periodically if certain UE fits for multicasting reception. For example, the BM-SC applies factors (as shown in FIG. 4) collected from the MBMS-GW and makes the multicast decision. For individual UEs, two bearers are established. One unicast EPS bearer is at least for PoC UL traffic. One multicast MBMS bearer, when appropriate, is used for PoC DL traffic. The MBMS bearer is established proactively or reactively.

Figure 12A:
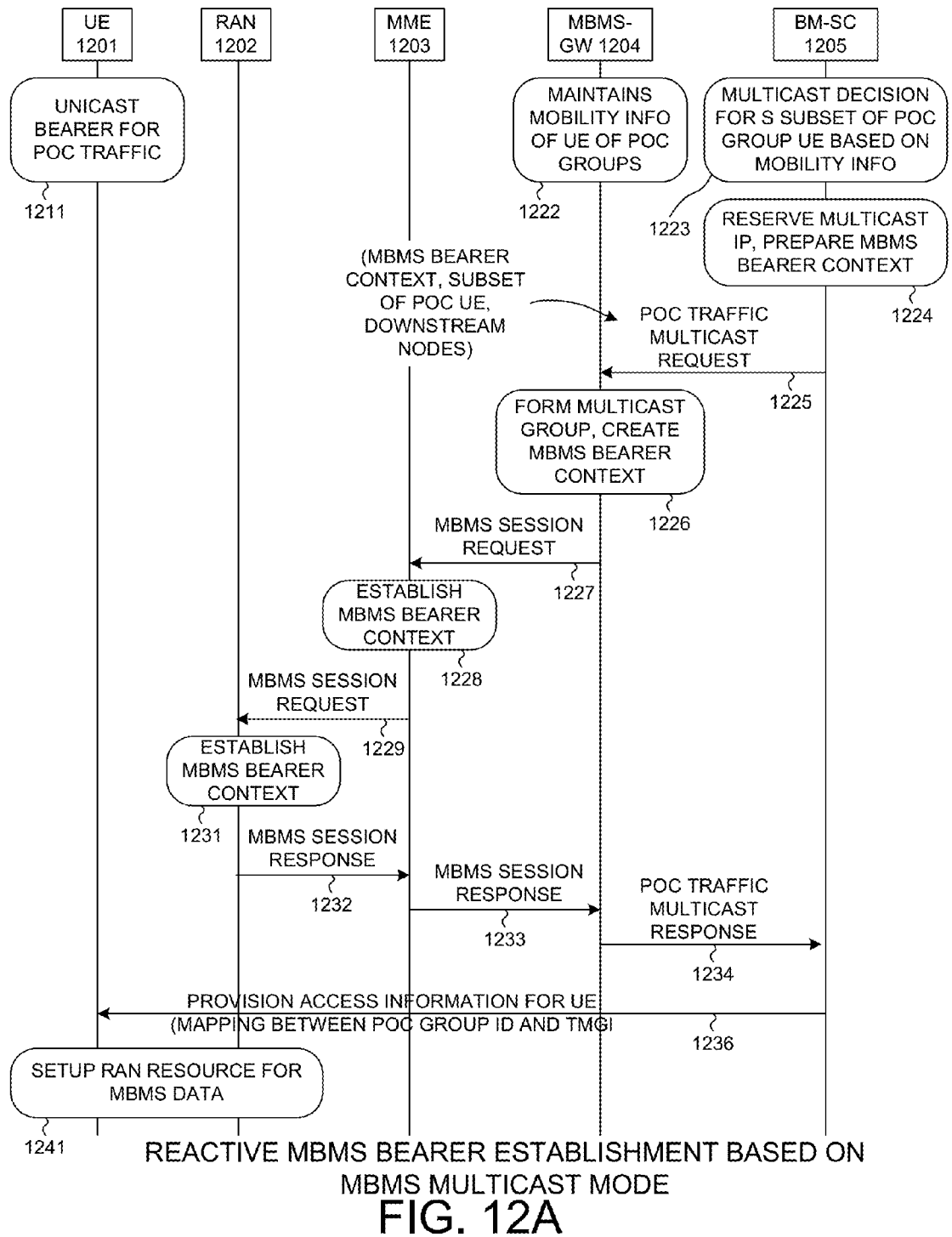
FIG. 12A illustrates one embodiment of reactive MBMS bearer establishment for PoC DL multicast traffic based on MBMS multicast mode.

FIG. 12A illustrates one embodiment of reactive MBMS bearer establishment for PoC DL multicast traffic based on MBMS multicast mode. In this embodiment, a PoC UE 1201 has one unicast bearer/connection established for PoC DL and UL traffic (step 1211). MBMS-GW 1204 maintains UE positions of PoC groups (step 1222). In step 1223, BM-SC 1205 makes multicast decision for a subset of PoC group UEs based on factors shown in FIG. 4 that are collected from e.g., MBMS-GW 1204. In step 1224, the BM-SC identifies PoC DL traffic multicasting opportunity for the subset of PoC group UEs, reserves a multicast IP, and prepares an MBMS bearer context configuration. In step 1225, the MBMS bearer context configuration, the subset of PoC UE, and the downstream nodes are passed from the BM-SC to the MBMS-GW via a PoC traffic multicast request. In step 1226, the MBMS-GW initiates and maintains a multicast group for delivery of the PoC DL traffic to the subset of PoC UEs. The MBMS-GW generates a PoC traffic distribution tree in IP backbone for the subset of PoC UEs. The distribution is between the BM-SC and relevant eNBs with the subset of PoC UEs. The delivery between the BM-SC and eNBs can be achieved via multiple unicast connections or via a multicast connection. The relevant eNBs corresponding to the subset of UEs can be defined via an MBSFN area. In step 1227, MME 1003 receives a session request and creates an MBMS bearer context according to the BM-SC configuration (step 1228). In step 1229, the relevant eNBs in RAN 1202 receive the session request and create the MBMS bearer context as well (step 1231). If BM-SC to eNB routing is achieved via backbone multicasting, an IP multicast address is also delivered to the relevant eNBs.

From steps 1232 to 1234, MBMS session response and PoC traffic multicast response are sent back from the eNBs, to MME, to MBMS-GW, and to the BM-SC. In step 1236, access information required for traffic multicast is announced to UE 1201 from BM-SC 1205. The access information comprises mapping information between the PoC group ID and the TMGI associated with the MBMS bearer. In step 1241, UE 1201 setup RAN resource for receiving MBMS data. The relevant eNBs allocate necessary radio resources for the transfer of MBMS data to the interested UEs. The MBMS session for the PoC DL traffic starts when the BM-SC is ready to send PoC traffic using the MBMS bearer service. The BM-SC filters PoC DL packets for PoC UEs with multicast decision, and delivers only one packet addressed to the corresponding multicast address. Alternatively, the PoC server should be informed of the multicasting behavior and only deliver one packet for the multicast group by addressing it to a corresponding multicast IP. After receiving PoC DL traffic from the MBMS bearer, UE 1051 can terminate PoC DL traffic from the unicast bearer.

Figure 12B:
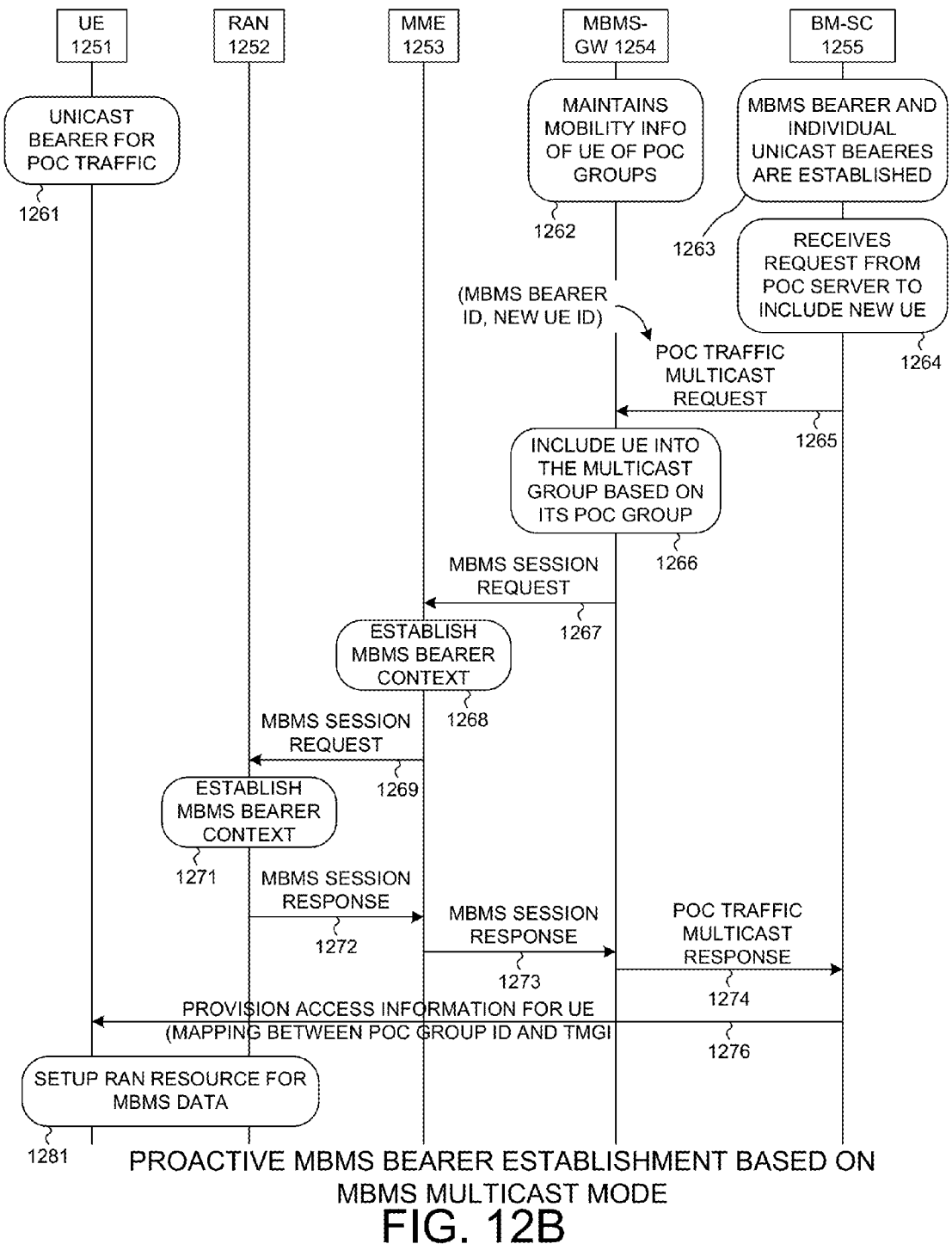
FIG. 12B illustrates one embodiment of proactive MBMS bearer establishment for PoC DL multicast traffic based on MBMS multicast mode.

FIG. 12B illustrates one embodiment of proactive MBMS bearer establishment for PoC DL multicast traffic based on MBMS multicast mode. In this embodiment, a new UE 1251 has one unicast bearer/connection established for PoC DL and UL traffic (step 1261). MBMS-GW 1254 maintains UE positions of PoC groups (step 1262). For proactive MBMS bearer establishment, MBMS multicast group for a PoC group is established beforehand, and PoC DL traffic delivery is through a corresponding MBMS bearer. In step 1263, an MBMS bearer is established for PoC DL traffic for the PoC group, and individual unicast bearers are established for UL traffic of individual PoC group UEs. When the new UE 1251 becomes active and shows its interest in monitoring PoC traffic in step 1261, the PoC server can make the decision of whether or not to include UE 1251 into the MBMS multicast group. In step 1264, BM-SC 1255 receives a request from the PoC server to include the new UE. The BM-SC passes an MBMS bearer ID corresponding to the PoC group to MBMS-GW 1254 by sending a PoC traffic multicast request (step 1265). The UE identity and downstream nodes for traffic delivery is passed to the MBMS-GW as well. In step 1266, the MBMS-GW includes the new UE into the multicast group based on its PoC group. The MBMS-GW updates the PoC traffic distribution tree to include the eNB corresponding to the new UE. In step 1267, MME 1253 receives a session request and an MBMS bearer context is created in the MME corresponding to the new UE if the MBMS bearer context is new to the MME (step 1268). In step 1269, the relevant eNB in RAN 1252 receives the session request and creates the MBMS bearer context if the MBMS bearer context is also new to the relevant eNB (step 1271).

From steps 1272 to 1274, MBMS session response and PoC traffic multicast response are sent back from the eNBs, to the MME, to the MBMS-GW, and to the BM-SC. In step 1276, access information required for traffic multicast is announced to UE 1251 from BM-SC 1255. The access information comprises mapping information between the PoC group ID and the TMGI associated with the MBMS bearer. In step 1281, UE 1251 setup RAN resource for receiving MBMS data. The relevant eNB allocates necessary radio resources for the transfer of MBMS data to UE 1251. After receiving PoC DL traffic from the MBMS bearer, UE 1251 can terminate PoC DL traffic from the unicast bearer.

Figure 13:
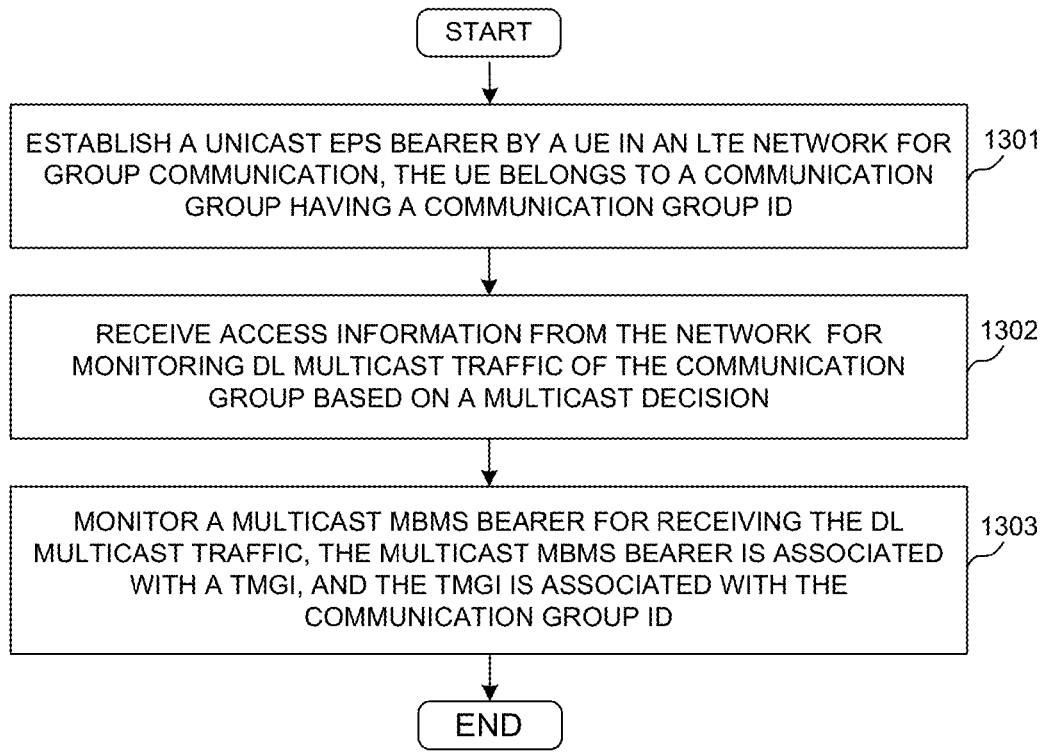
FIG. 13 is a flow chart of supporting PoC multicast traffic using MBMS in LTE network in accordance with one novel aspect.

FIG. 13 is a flow chart of supporting PoC multicast traffic using MBMS in LTE network in accordance with one novel aspect. In step 1301, a UE established a unicast EPS bearer in an LTE network for group communication. The UE belongs to a communication group having a communication group ID. In step 1302, the UE receives access information from the network for monitoring DL multicast traffic of the communication group based on a multicast decision. In step 1303, the UE monitors a multicast MBMS bearer for receiving the DL multicast traffic. The multicast MBMS bearer is associated with a TMGI, and the TMGI is associated with the communication group ID. In one embodiment, the access information comprises mapping information between the TMGI and the communication group ID.

Radio Resource Efficient Transmission for PoC

To reuse EPS MBMS radio transmission method for delivering PoC DL traffic in selected cells, more efficient radio resource utilization can be achieved by PoC DL traffic multicasting in RAN level. For control region capacity perspective, this can be achieved by enabling multiple UEs to monitor the same control channel used for scheduling DL assignment. For data region capacity perspective, this can be achieved by enabling multiple UEs to monitor the PoC DL traffic from the same DL assignment if the UEs belong to the same PoC group. In one novel aspect, radio resource efficient transmission of PoC DL traffic can be achieved by sharing radio resources using cell-broadcasting scheme or in cell-multicasting scheme. Cell-broadcasting scheme refers to the use of MBSFN subframe exclusively for PoC DL traffic. Cell-multicasting scheme refers to the dynamic scheduling of PDSCH for multiple UEs by addressing a corresponding PDCCH to a group radio identifier. Furthermore, multiple PoC UEs can share the same PDCCH to reduce control channel loading for PoC DL traffic scheduling.

Figure 14:
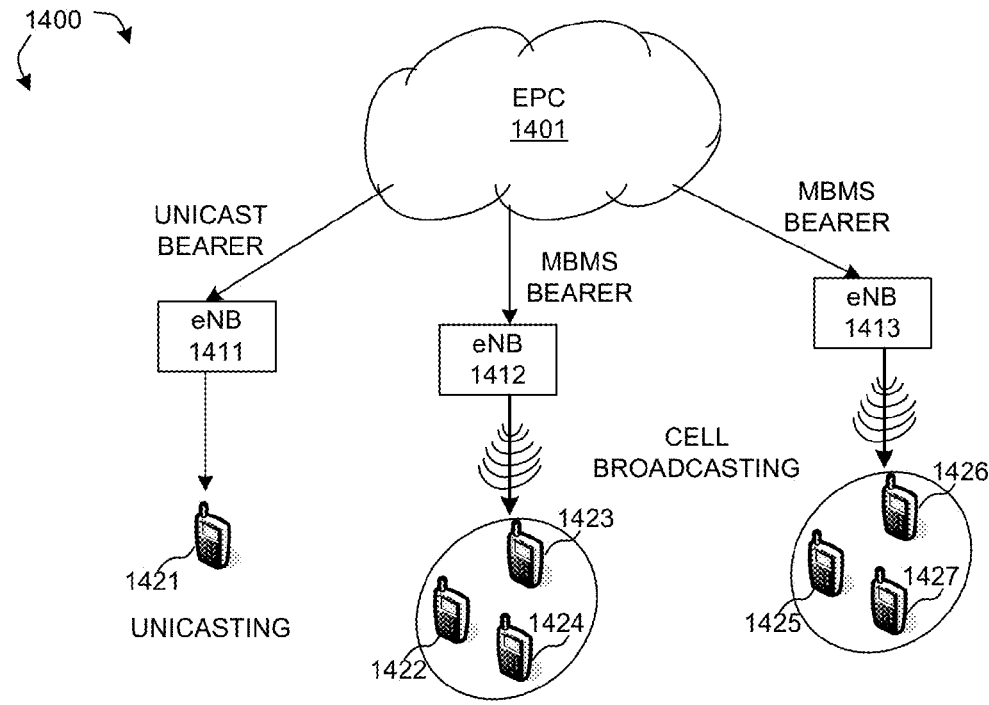
FIG. 14 illustrates cell broadcasting radio transmission method for PoC service.

FIG. 14 illustrates cell broadcasting radio transmission method for PoC service in LTE network 1400. LTE network 1400 comprises a core network EPC 1401, a plurality of base stations eNB 1411-1413, and a plurality of user equipments UE 1421-1427. In this embodiment, the assumption is that PoC UE mobility has been taken care by a logical entity above RAN (e.g., a PoC server or an MBMS-GW). Multicasting decision for a subset of PoC UEs of the same PoC group within a cell (clustered PoC group UEs) is already made in the network side, e.g., by a BM-SC or by the PoC server. The PoC DL traffic for the clustered PoC group UEs that are decided for multicasting is routed to relevant eNBs by the core network with MBMS delivery system. In the example of FIG. 14, UE 1422-1424 are clustered PoC UEs for receiving PoC traffic from eNB 1412, while UE 1425-1427 are clustered PoC UEs for receiving PoC traffic from eNB 1413.

The PoC DL traffic multicasting in RAN using cell-broadcasting method is achieved via MBMS radio broadcasting method, i.e., same as LTE MBMS radio transmission. The relevant eNBs broadcast PoC DL traffic by using MBSFN subframe. PoC DL traffic shares MBSFN subframes with MBMS services. However, the number of intra-cell PoC groups should be large enough to justify the exclusive usage of MBSFN subframe. If one MBSFN subframe can be shared with MBMS service, then MBSFN subframe resources can be better utilized. TMGI can be used to distinguish traffic from different PoC groups. MBMS PHY transmission method is reused. MBSFN area is used to define relevant eNBs for PoC group traffic distribution.

From UE perspective, UE needs to receive TMGI to find its allocation. TMGI is assigned by BM-SC and is used to identify an MBMS bearer service within one PLMN. PoC group ID should be linked to TMGI and UE should be informed of the linkage between TMGI and PoC group ID. For example, the linkage may be provided by non-dedicated RRC signaling, i.e., system information broadcasting, by signaling in data plane, or by agreed mapping rule.

Under current EPS MBMS support, there is no HARQ retransmission for PoC traffic delivery. For radio transmission robustness, PHY layer repetitive transmission can be considered. To allow repetitive transmission for a fixed number of times, additional eNB support is required to distinguish between PoC multicast bearer and MBMS multicast bearer so that the repetitive transmission behavior can be applied. For example, an eNB needs to know which TMGI is linked to PoC traffic so that repetitive transmission can be applied. In addition to distribute repetitive transmission in time domain, the repetitive transmission can be performed in different frequency domain resources. Furthermore, in MBMS, the content provider can adapt codec rate to meet a long-term target packet error rate by higher layer signaling.

Figure 15:
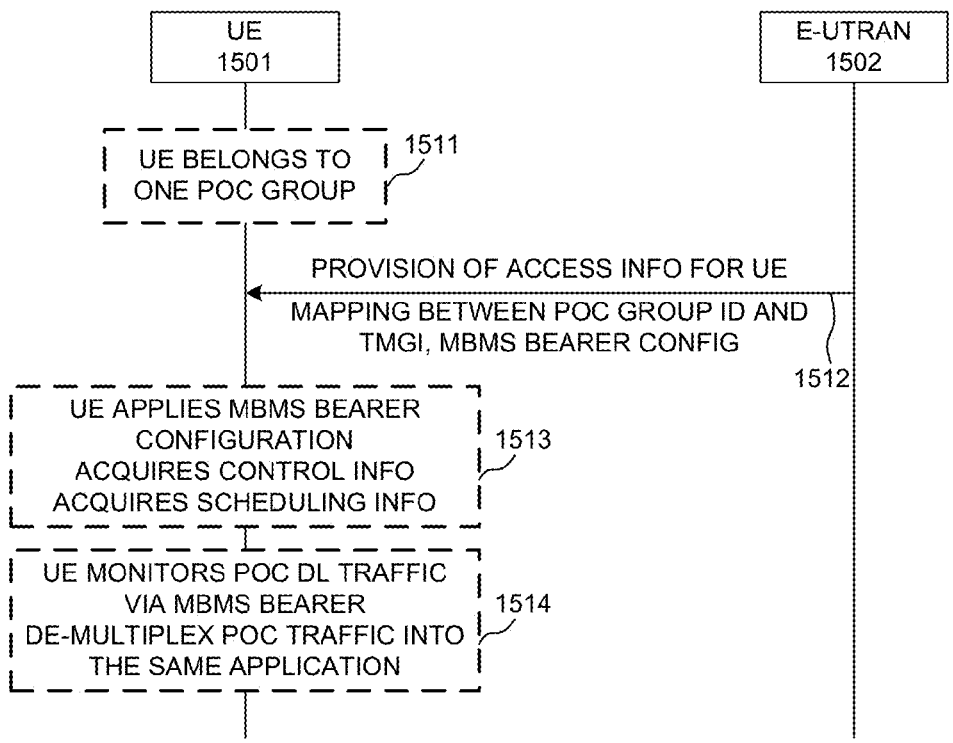
FIG. 15 illustrates one embodiment of cell broadcasting radio transmission.

FIG. 15 illustrates one embodiment of cell broadcasting radio transmission. In step 1511, UE 1501 already belongs to a PoC group, and a unicast EPS bearer for group communication is already established. In step 1512, UE 1501 receives required access information from the network. The access information comprises information required for receiving PoC traffic multicasting, e.g., TMGI corresponding to the PoC group and bearer QoS. The access information also includes MBMS bearer configuration, which is transmitted in a similar manner as for MBMS traffic. In step 1513, UE 1501 applies the MBMS bearer configuration and acquires PoC DL traffic scheduling information based on control information broadcasted in system information block. The control information relevant to the PoC group is identified by the TMGI, and traffic is scheduled in MBSFN subframes similar to MBMS service. In step 1514, UE 1501 gets ready for monitoring the PoC DL traffic via the MBMS bearer. For UEs with both unicast and MBMS bearers, it can monitor its PoC traffic via either the original unicast bearer or the newly established MBMS bearer or both. The PoC traffic is delivered from either the unicast bearer or the MBMS bearer, but not at the same time from both bearers on purpose. UE 1501 is not configured with feedback channel for HARQ, RLC ARQ, ROHC on the MBMS bearer, the UE shall apply different radio reception method based on the configuration message (e.g., number of repetitive transmission). Furthermore, because UE 1501 may or may not know which bearer is used to deliver its PoC traffic for a given moment, UE 1501 demultiplexes PoC DL traffic received either from the MBMS bearer or from the unicast bearer into the same application port for group communication.

Figure 16:
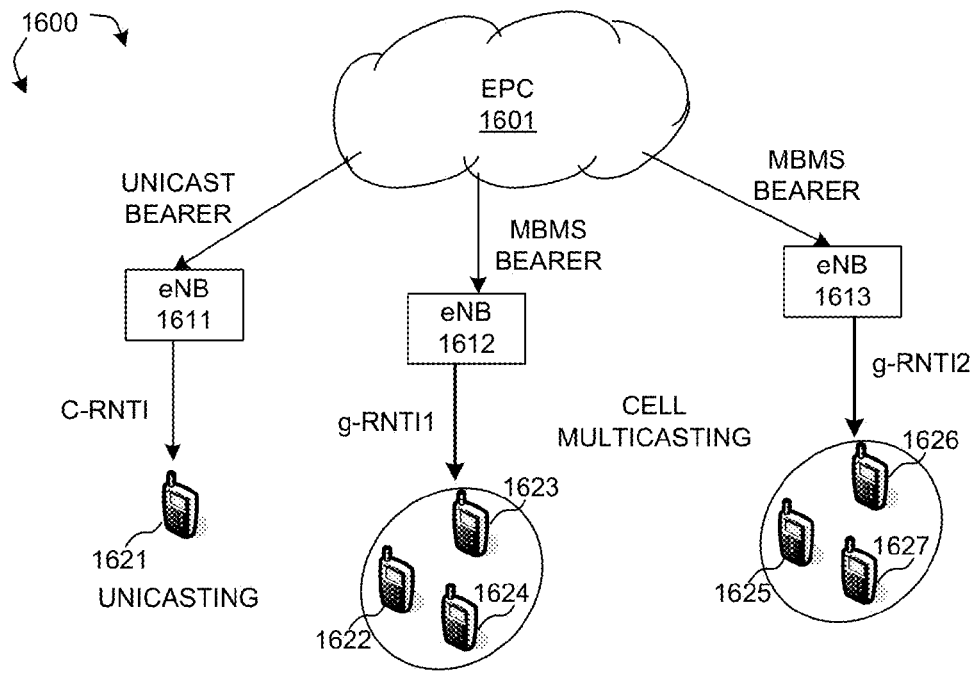
FIG. 16 illustrates cell multicasting radio transmission method for PoC service.

FIG. 16 illustrates cell multicasting radio transmission method for PoC service in LTE network 1600. LTE network 1600 comprises a core network EPC 1601, a plurality of base stations eNB 1611-1613, and a plurality of user equipments UE 1621-1627. In this embodiment, the assumption is that PoC UE mobility has been taken care by a logical entity above RAN (e.g., a PoC server or an MBMS-GW). Multicasting decision for a subset of PoC UEs of the same PoC group within a cell (clustered PoC group UEs) is already made by the logical entity. The PoC DL traffic for the clustered PoC group UEs that are decided for multicasting is routed to relevant eNBs by the core network with MBMS delivery system. In the example of FIG. 16, UE 1622-1624 are clustered PoC UEs for receiving PoC traffic from eNB 1612, while UE 1625-1627 are clustered PoC UEs for receiving PoC traffic from eNB 1613.

For cell multicasting radio transmission, PoC DL traffic multicasting in RAN is achieved via dynamic scheduling by a group identifier, e.g., a group Radio Network Temporary identifier (g-RNTI), which is similar to dynamic scheduling scrambled by a C-RNTI in radio unicasting case. For example, UE 1621 is scheduled to monitor PDCCH by C-RNTI, UE 1622-1624 are scheduled to monitor PDCCH by a first g-RNTI1, and UE 1625-1627 are scheduled to monitor PDCCH by a second g-RNTI2. The PoC UEs can acquire PoC DL traffic via PoC radio multicasting or via PoC radio unicasting. The switching between PoC radio multicasting and PoC radio unicasting is supported for PoC UEs, and either g-RNTI or C-RNTI is used for PoC DL traffic transmission via PoC radio multicasting or unicasting respectively.

From UE perspective, UE needs to receive TMGI to distinguish traffic from different PoC groups. PoC group ID is maintained at PoC server and known in data plane. TMGI is assigned by BM-SC and is used to identify an MBMS bearer service within one PLMN. UE should be informed of the linkage between PoC group ID and TMGI before receiving PoC traffic. For example, the linkage may be provided by non-dedicated RRC signaling, i.e., system information broadcasting, by signaling in data plane, or by agreed mapping rule. In addition, UE should be informed to monitor which g-RNTI, i.e., the linkage between g-RNTI and TMGI. Such linkage information can also be notified to UE via RRC signaling (e.g., system information broadcasting) or by agreed mapping rule.

For radio transmission robustness, PHY layer repetitive transmission can be considered. To allow repetitive transmission for a fixed number of times, additional eNB support is required to distinguish between PoC multicast bearer and MBMS multicast bearer so that the repetitive transmission behavior can be applied. In addition to distribute repetitive transmission in time domain, the repetitive transmission can be performed in different frequency domain resources.

To adopt HARQ mechanism, a common feedback channel is used for on-off detection, especially for delay-tolerant PoC data. For ACK PoC UE, nothing is done. For NACK PoC UE, energy is transmitted on a configured resource. A proper threshold is determined by considering the signal cancelation due to destructive interference between multiple NACK signaling. Feedback resource is informed implicitly since UE identity is unknown to eNB. For the common feedback channel, the HARQ process number should all have the same process ID of the PoC retransmission, or should be managed in a way that indicates the specific HARQ process for PoC retransmission. For example, a dedicated HARQ process similar to a broadcast channel can be used.

Figure 17:
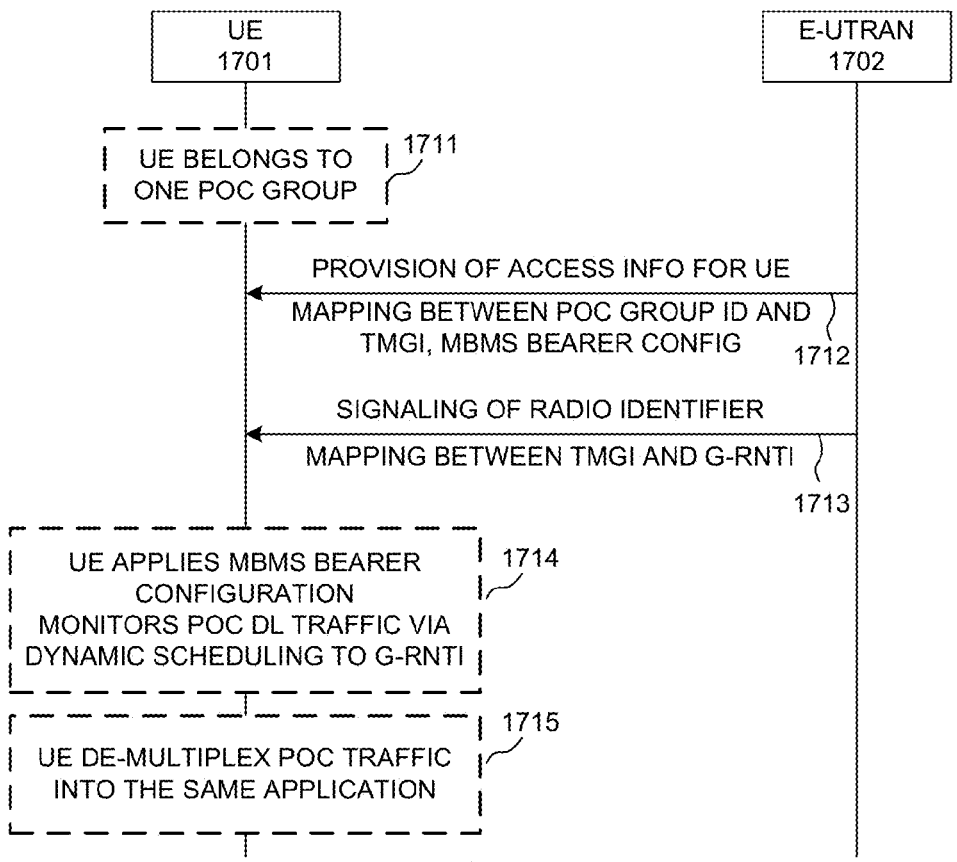
FIG. 17 illustrates one embodiment of cell multicasting radio transmission.

FIG. 17 illustrates one embodiment of cell multicasting radio transmission. In step 1711, UE 1701 already belongs to a PoC group, and a unicast EPS bearer for group communication is already established. In step 1712, UE 1701 receives required access information from the network. The access information comprises information required for receiving PoC traffic multicasting, e.g., TMGI corresponding to the PoC group and bearer QoS. The access information also includes MBMS bearer configuration, which is transmitted in a similar manner as for MBMS traffic. In step 1713, UE 1701 receives signaling of radio identifier (g-RNTI) and mapping between the TMGI and g-RNTI. In step 1714, UE 1701 applies the MBMS bearer configuration and gets ready for acquiring PoC DL traffic addressed to PDCCH scrambled with the received g-RNTI. For UEs with both unicast and MBMS bearers, it can monitor its PoC traffic via either the original unicast bearer or the newly established MBMS bearer or both. The PoC traffic is delivered from either the unicast bearer or the MBMS bearer, but not at the same time from both bearers. UE 1701 is not configured with feedback channel for HARQ, RLC ARQ, ROHC on the MBMS bearer, the UE shall apply different radio reception method based on the configuration message (e.g., number of repetitive transmission). In step 1715, because UE 1701 may or may not know which bearer is used to deliver its PoC traffic for a given moment, UE 1701 de-multiplexes PoC DL traffic received either from the MBMS bearer or from the unicast bearer into the same application port for group communication.

It can be seen that with proper EPC support, three delivery methods can be concurrently used for PoC traffic delivery: radio unicasting, cell broadcasting, and cell multicasting. From UE perspective, PoC DL traffic from the three means is de-multiplexed to the same application port. For the cell multicasting method, signaling reduction for dynamic scheduling of the PoC DL traffic can be achieved. In one novel aspect, one common g-RNTI is used for PoC DL traffic scheduling for different PoC groups within a cell. Furthermore, for PDCCH space reduction, UL PUSCH resource can also be granted through the common g-RNTI for multiple UEs of the PoC groups.

Figure 18:
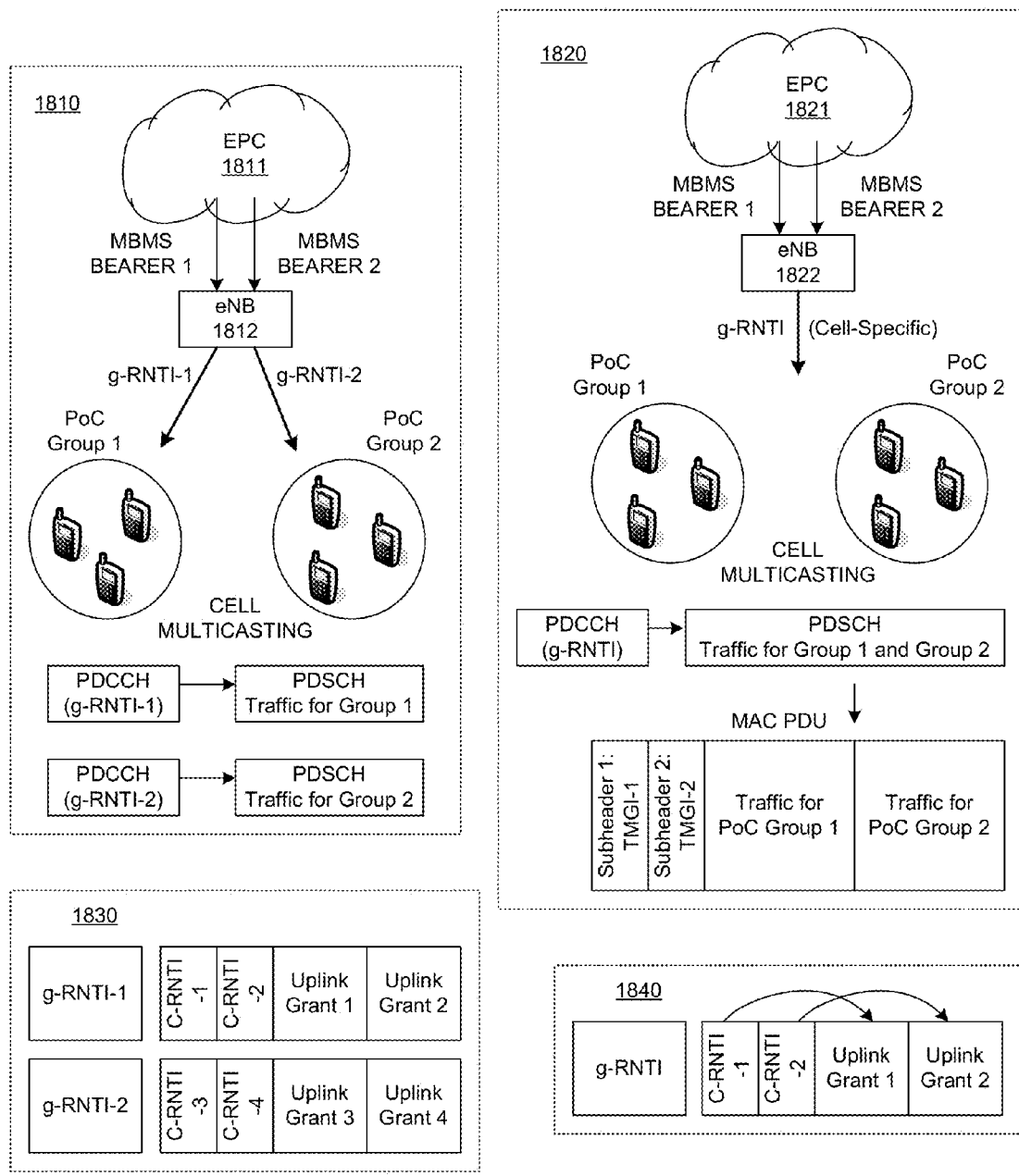
FIG. 18 illustrates a method of sharing PDCCH among PoC UEs for PoC DL traffic scheduling.

FIG. 18 illustrates a method of sharing PDCCH among PoC UEs for PoC DL traffic scheduling. In LTE network 1810, a cluster UEs belong to PoC group 1, and another cluster UEs belong to PoC group 2. Both PoC group UEs are served by the same eNB 1812. For PoC DL traffic multicasting, EPC establishes MBMS bearer 1 for PoC DL traffic to be delivered to PoC group 1, and MBMS bearer 2 for PoC DL traffic to be delivered to PoC group 2. In RAN cell multicasting, eNB 1812 dynamically schedules PoC DL traffic to PoC group 1 and PoC group 2 using g-RNTI-1 and g-RNTI-2 respectively. As a result, UEs from PoC group 1 monitors PDSCH and acquires PoC DL traffic addressed to PDCCH scrambled with g-RNTI-1, and UEs from PoC group 2 monitors PDSCH and acquires PoC DL traffic addressed to PDCCH scrambled with g-RNTI-2.

In LTE network 1820, a cluster UEs belong to PoC group 1, and another cluster UEs belong to PoC group 2. Both PoC group UEs are served by the same eNB 1822. For PoC DL traffic multicasting, EPC establishes MBMS bearer 1 for PoC DL traffic to be delivered to PoC group 1, and MBMS bearer 2 for PoC DL traffic to be delivered to PoC group 2. MBMS bearer 1 is associated with TMGI-1 and MBMS bearer 2 is associated with TMGI-2. In RAN cell multicasting, eNB 1822 dynamically schedules PoC DL traffic to PoC group 1 and PoC group 2 using a common g-RNTI. As a result, UEs from PoC group 1 monitors PDSCH and acquires PoC DL traffic addressed to PDCCH scrambled with the common g-RNTI, and find its PoC traffic by looking for MAC PDU sub-header that matches identifier TMGI-1. Similarly, UEs from PoC group 2 monitors PDSCH and acquires PoC DL traffic addressed to PDCCH scrambled with the same common g-RNTI, and finds its PoC traffic by looking for MAC PDU sub-header that matches identifier TMGI-2.

For further PDCCH space reduction, UE uplink PUSCH resource can also be granted through a common g-RNTI. As depicted by box 1830, outstanding g-RNTIs are used for each PoC group, e.g., g-RNTI-1 for PoC group 1 and g-RNTI-2 for PoC group 2. For each individual UE, the MAC sub-header carries UE's C-RNTI linking to the corresponding UL grant. On the other hand, as depicted by box 1840, a single g-RNTI is used for all PoC groups. For each individual UE, the MAC sub-header carries each UE's C-RNTI that links to the corresponding UL grant.

Figure 19:
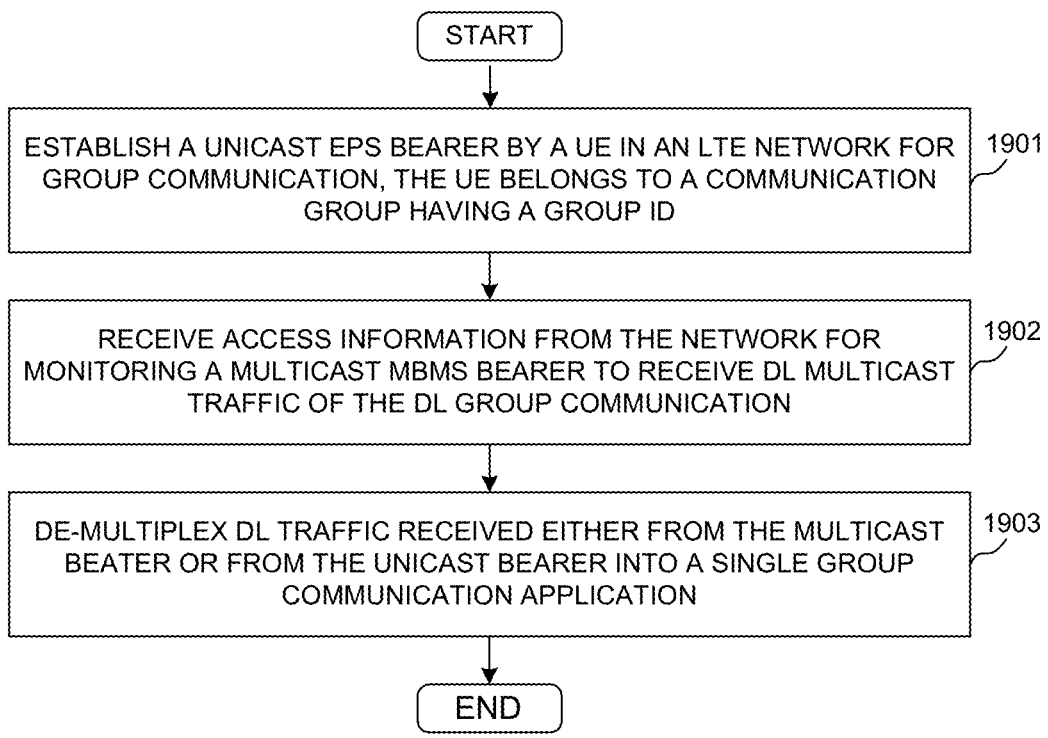
FIG. 19 is a flow chart of radio resource efficient transmission for PoC multicast traffic in accordance with one novel aspect.

FIG. 19 is a flow chart of radio resource efficient transmission for PoC multicast traffic in accordance with one novel aspect. In step 1901, a UE establishes a unicast EPS bearer in an LTE network for group communication. The UE belongs to a communication group having a group ID. In step 1902, the UE receives access information from the network for monitoring a multicast MBMS bearer to receiving DL multicast traffic of the DL group communication. In step 1903, the UE monitors and de-multiplexes the DL traffic received from the multicast bearer or from the unicast bearer into a single group communication application. In one embodiment, the UE receives the DL group communication in MBSFN subframes broadcasted in a serving cell. In another embodiment, the UE receives the DL group communication by monitoring a PDCCH scrambled by a g-RNTI.

Method of PoC Multicast Service Continuity

For PoC traffic multicasting, PoC group UE mobility management is required in the network side so that PoC traffic can be properly routed to relevant eNBs. If PoC group mobility is not managed in the core network, PoC multicast bearer cannot be handed over to a new target cell in case of handover events. After receiving a handover (HO) command, a PoC UE can request to switch back to the unicasting distribution of PoC traffic. By the time the PoC UE receives the HO command, the channel is likely too bad for reliable communication, which causes PoC service interruption. Because the PoC UE most likely requests to switch back to unicasting distribution only after the handover command reception, PoC service interruption time is longer than normal voice call. Such long service interruption of PoC DL traffic multicasting during handover can be avoided. For example, a smaller PoC DL multicasting radio coverage is applied for early termination of multicast distribution at cell edge. The early termination of PoC DL multicasting is triggered by RRC measurement events. Furthermore, PoC service continuity is maintained by selecting proper target cell in handover case.

Figure 20:
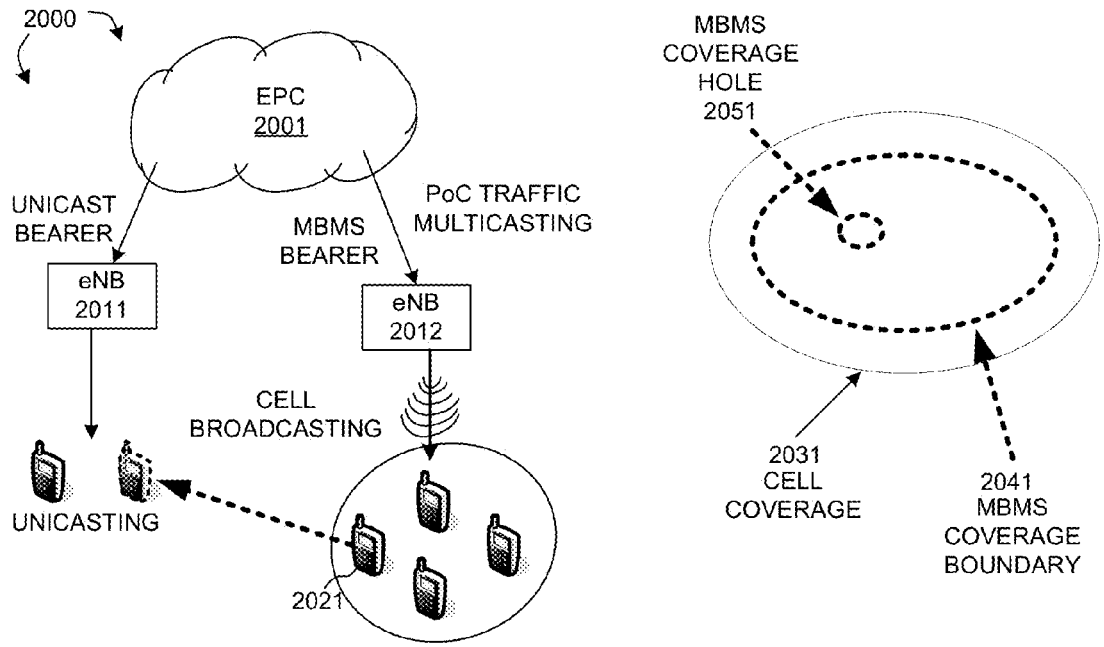
FIG. 20 illustrates avoiding long service interruption of PoC traffic multicasting during handover.

FIG. 20 illustrates a method of avoiding long service interruption of PoC traffic multicasting during handover in LTE network 2000. In the example of FIG. 20, UE 2021 belongs to a PoC group and initially receives PoC traffic delivered by eNB 2012 from an MBMS bearer. Later on, UE 2021 leaves the MBMS coverage area and is handed over to eNB 2011. If UE 2021 requests to switch to the unicast bearer for PoC traffic delivery after the handover, then the PoC service interruption is very long. Therefore, in accordance with one novel aspect, UE 2021 requests to switch the PoC traffic from the MBMS bearer to the unicast bearer before handover occurs. FIG. 20 illustrates a cell boundary 2031 and an MBMS coverage boundary 2041 and an MBMS coverage hole 2051. The service interruption due to an MBMS coverage hole and due to leaving an MBMS coverage is unbearable. In one embodiment, to remedy long service interruption due to late termination of PoC multicasting, the MBMS coverage boundary 2014 is defined to be a radio coverage for PoC DL traffic multicasting that is smaller than the cell coverage 2031. PoC UE out of the MBMS coverage should request to switch back for traffic unicast. The smaller radio coverage is designed so that PoC UE is switched back to unicast distribution before handover command is received. The restriction of radio coverage for PoC DL traffic can be achieved by limiting DL transmit power and/or by a bit more aggressive modulation and coding scheme for MBMS radio signal as compared to unicast radio signal.

Figure 21:
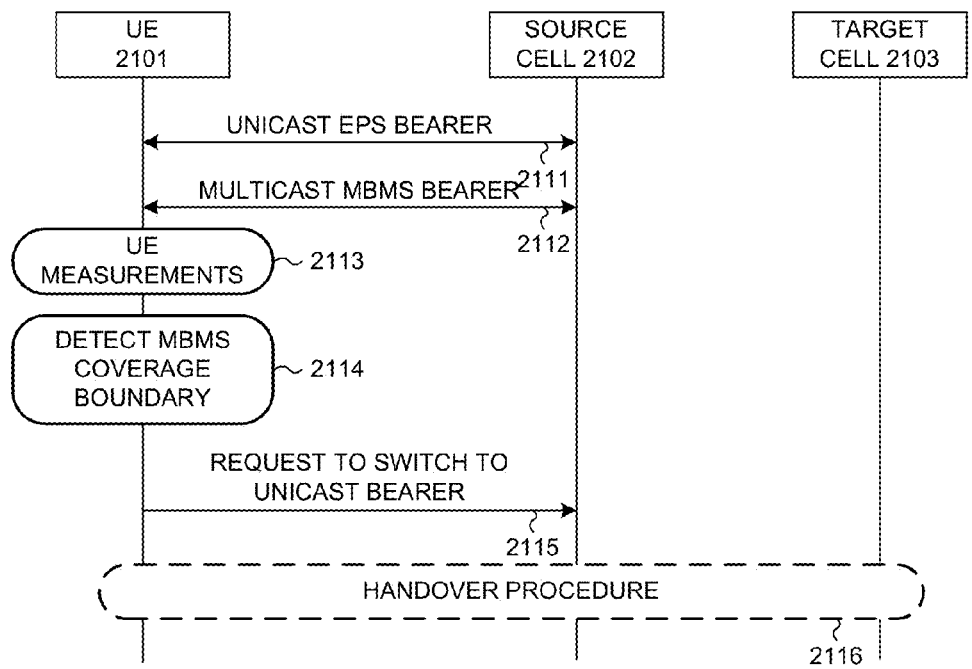
FIG. 21 illustrates one embodiment of early termination of PoC multicast traffic.

FIG. 21 illustrates one embodiment of early termination of PoC multicast traffic. In step 2111, a unicast EPS bearer is established for UE 2101 for PoC traffic in a source cell 2102. In step 2112, a multicast MBMS bearer is configured by the network for PoC traffic multicasting in the source cell 2102. UE 2101 is then ready to monitor the MBMS bearer for PoC DL traffic multicasting. In step 2113, UE 2101 performs radio signal measurements as configured by the network. In step 2114, UE 2101 detects that it is approaching an MBMS coverage boundary, which is defined as the radio boundary for PoC traffic multicasting. The UE should be able to know when it is approaching the cell boundary. For example, UE 2101 may use RRC HO-related measurement event triggering to predict that the UE is very likely to be around cell edge. For example, the HO-related RRC measurement events include events A2/A3/A5/A6/B2. Together with the knowledge that MBMS signal strength is decreased, the UE knows that it is around MBMS coverage boundary, rather than a normal MBMS coverage hole. UE 2101 thus requests to switch back for traffic unicasting in step 2115. Later on, in step 2116, UE 2101 performs handover procedure and handovers to a target cell 2103. Because the UE switches to traffic unicasting before receiving handover command, PoC service interruption time is reduced.

Figure 22:
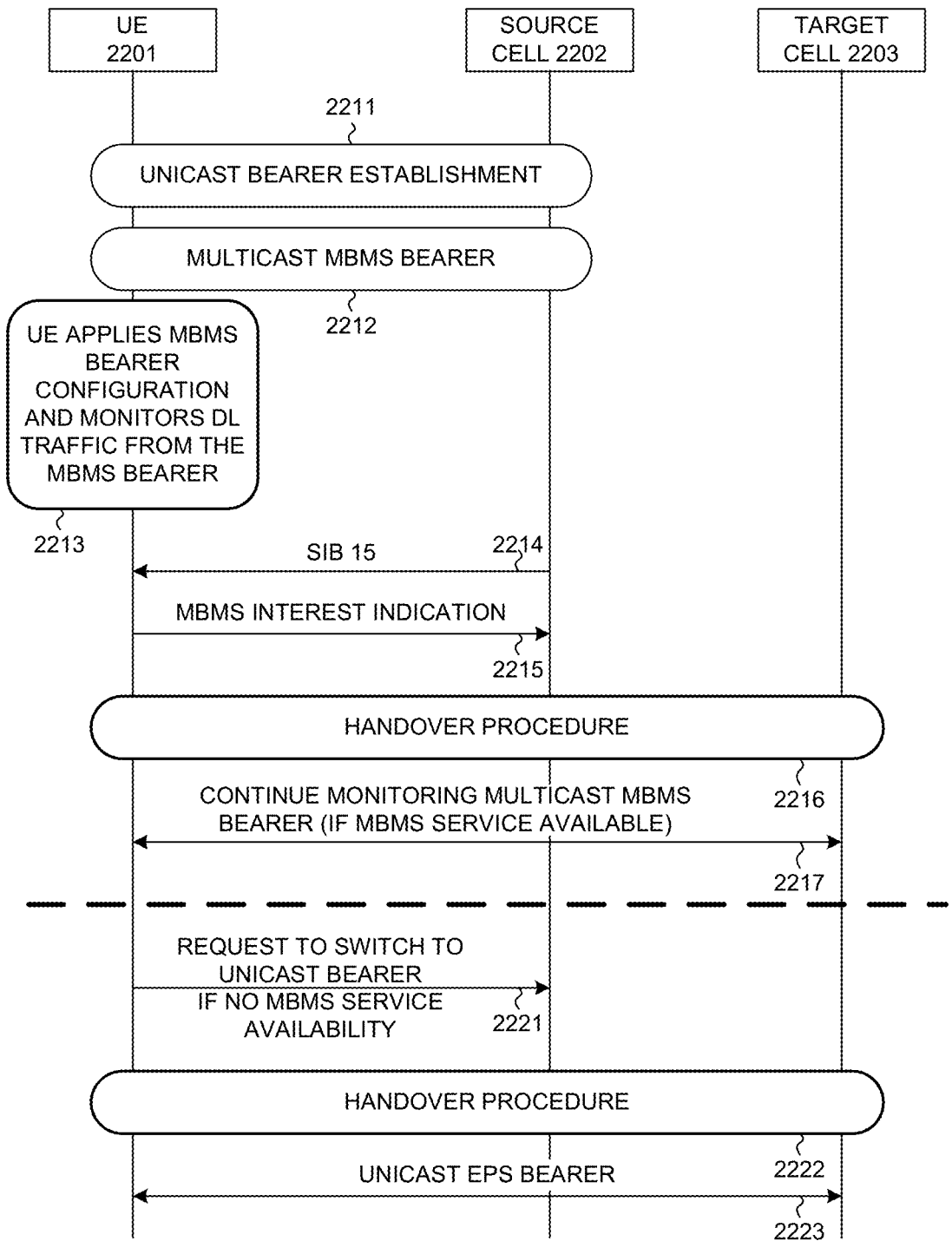
FIG. 22 illustrates one embodiment of supporting PoC service continuity.

FIG. 22 illustrates one embodiment of supporting PoC multicast service continuity. In step 2211, a unicast EPS bearer is established for UE 2201 for PoC traffic in a source cell 2202. In step 2212, a multicast MBMS bearer is configured by the network for PoC traffic multicasting in the source cell 2202. In step 2213, UE 2201 applies the MBMS bearer configuration and monitors PoC DL traffic from the multicast MBMS bearer. In step 2214, UE 2201 receives system information (e.g., SIB 15) broadcasted in cell 2202. The system information in SIB 15 provides the MBMS service availability information in neighboring cells. In RRC idle mode, UE can use this information for cell re-selection (i.e., select cells with MBMS service for PoC multicast service continuity possibility).

In RRC connected mode, UE can use this information and send indication to its serving eNB its preferred target cell for handover (cells with MBMS services for PoC multicast service continuity). For example, in step 2215, UE 2201 sends an MBMS interest indication to the network. In step 2216, UE 2201 is handed over to a preferred target cell 2203 based on its MBMS interest indication. In step 2217, UE 2201 continue to monitor the multicast MBMS bearer in the target cell 2203 if MBMS service is available. However, in case there is no MBMS services in neighboring cells, then UE 2201 requests to switch PoC traffic from the MBMS bearer to the unicast bearer for service continuity (step 2221). In step 2222, UE 2201 performs handover procedure to handover to target cell 2203. In step 2223, a unicast EPS bearer is established for UE 2201 in the target cell 2203 for receiving PoC traffic.

Figure 23:
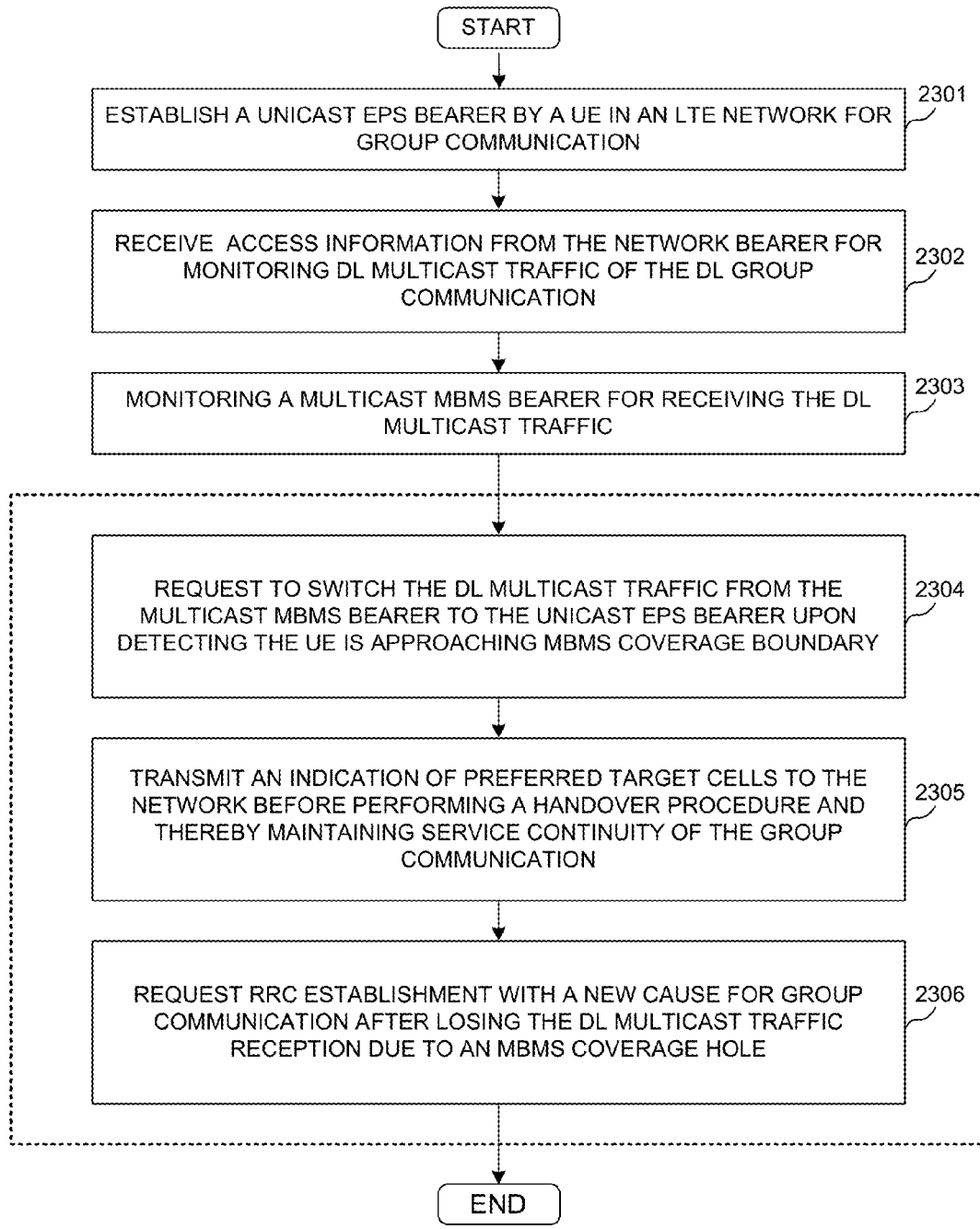
FIG. 23 is a flow chart of a method of supporting PoC service continuity in accordance with one novel aspect.

FIG. 23 is a flow chart of a method of supporting PoC multicast service continuity in accordance with one novel aspect. In step 2301, a UE established a unicast EPS bearer in an LTE network for group communication. The UE belongs to a communication group having a communication group ID. In step 2302, the UE receives access information from the network for monitoring DL multicast traffic of the communication group based on a multicast decision. In step 2303, the UE monitors a multicast MBMS bearer for receiving the DL multicast traffic. The multicast MBMS bearer is associated with a TMGI, and the TMGI is associated with the communication group ID. In one embodiment, the access information comprise mapping information between the TMGI and the communication group ID. To reduce PoC service interruption time and to maintain PoC service continuity, there are several scenarios. In step 2304 (scenario 1), the UE requests to switch the DL multicast traffic from the MBMS bearer to the unicast bearer upon detecting that the UE is approaching an MBMS coverage boundary. In step 2305 (scenario 2), the UE transmits an indication of preferred target cells to the network before performing a handover procedure and thereby maintaining service continuity of the group communication. The indication may be based on MBMS service availability information of neighboring cells broadcasted in SIB 15. In step 2306 (scenario 3), the UE is in RRC idle mode and lost the DL multicast traffic due to an MBMS coverage hole. The UE then requests RRC establishment with a new cause for group communication contained in the RRC request message. The benefit is that when the network is congested, the network can offload traffic from the unicast bearer to the MBMS bearer soon (after UE gets out the MBMS coverage hole) and the unicast resource is freed for other UEs. Following this logic, the network should serve a UE with priority upon receiving connection request with such cause.

Method of RRC Idle Mode Reception for PoC Traffic

Keeping UEs in connected mode without data transmission is not always favored due to UE power consumption. In EUTRA, connected mode DRX operation can be used for power saving. However, CQI reporting, SRS configuration etc. still causes extra power consumption as compared to idle mode. It is thus beneficial to enable idle mode PoC traffic reception from power saving and call setup latency perspective. For PoC UL traffic, UE needs to be in connected mode anyway. With idle mode reception, call setup latency is experienced at one end (UL side) only for establishing the UL RRC connection. In MBMS broadcast mode, RRC_IDLE mode reception become possible. In one novel aspect, PoC DL traffic is delivered via EPS MBMS service in the core network. EPS uses MBMS broadcast mode, and PoC UEs in RRC_IDLE mode can be configured to monitor PoC traffic on MBMS bearers. Both cell broadcasting using LTE MBSM radio transmission and cell multicasting using LTE dynamic scheduling radio transmission may be used for RRC_IDLE mode reception. In case of PoC UL transmission from a UE, the UE needs to enter RRC_Connected mode before PoC UL transmission.

Figure 24:
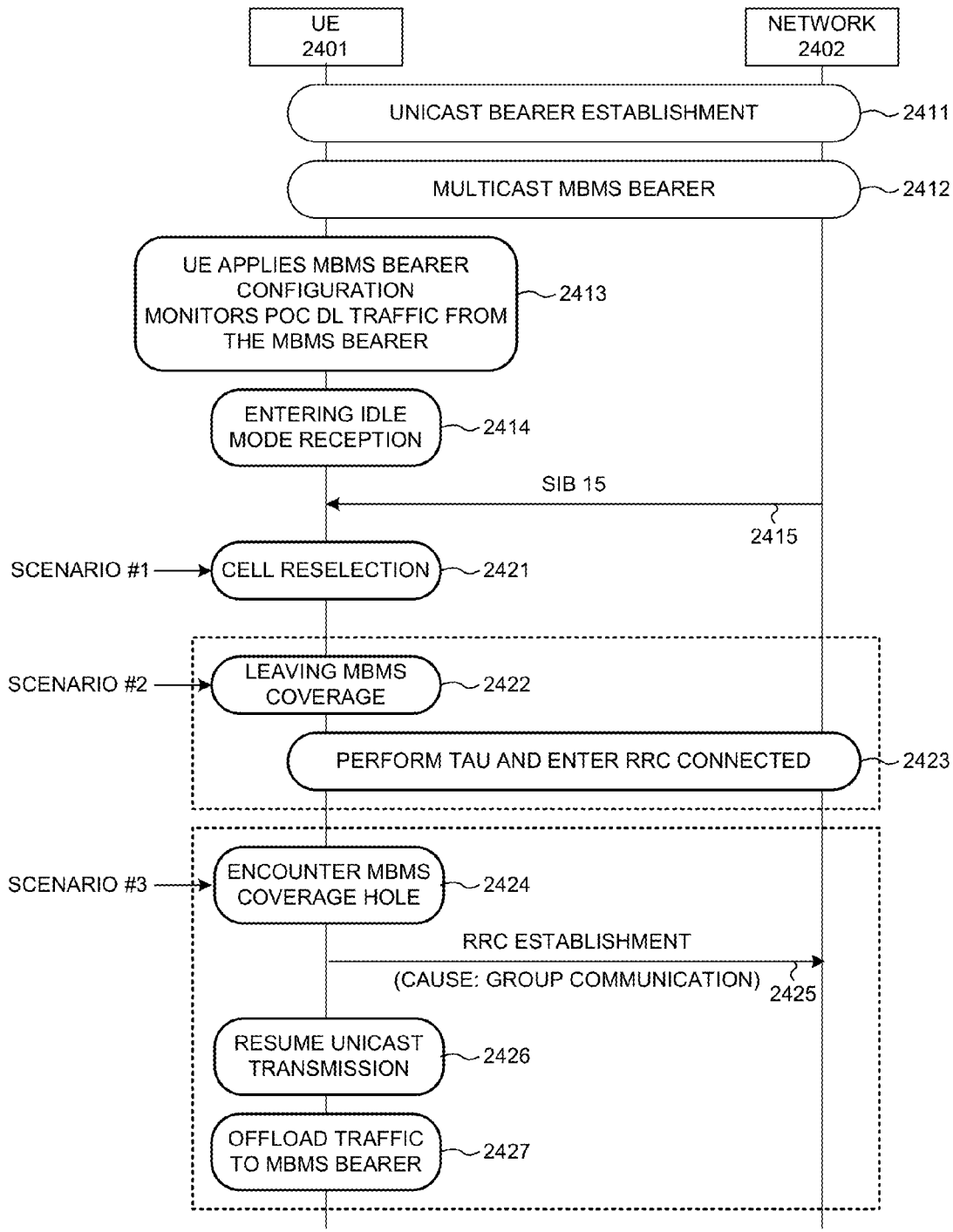
FIG. 24 illustrates one embodiment of supporting idle mode reception of PoC traffic.

FIG. 24 illustrates one embodiment of supporting idle mode reception of PoC traffic. In step 2411, a unicast EPS bearer is established for UE 2401 for PoC UL traffic. In step 2412, a multicast MBMS bearer is configured by the network for PoC DL traffic multicasting. In step 2413, UE 2401 applies the MBMS bearer configuration and monitors PoC DL traffic from the multicast MBMS bearer. In step 2414, UE 2401 enters RRC_IDLE mode. As a result, the radio bearer part of the unicast EPS bearer is released. UE 2401 continues to monitor the MBMS bearer for PoC DL traffic in RRC_IDLE mode. In one embodiment, EPS MBMS radio transmission for broadcasting PoC DL traffic in selected cells can be reused. As a result, UE 2401 receives the PoC DL traffic in MBSFN frames broadcasted in its camped cell. In step 2415, UE 2401 receives system information (e.g., SIB 15) broadcasted in the network. The system information in SIB 15 provides the MBMS service availability information of neighboring cells.

In step 2421 (scenario #1), UE 2401 performs cell reselection (i.e., select cells with MBMS service for PoC multicast service continuity possibility) based on the system information in SIB 15. UE 2401 can choose to camp on a new PoC DL traffic-broadcasting cell, and continue the PoC DL traffic reception in idle mode. In step 2422 (scenario #2), UE 2401 detects that it is leaving the MBMS coverage. In step 2423, UE 2401 enters RRC_Connected mode and requests to recover the radio bearer part of the unicast EPS bearer for PoC traffic. For example, UE 2401 performs tracking area update (TAU) to request recovering the radio bearer. In step 2424 (scenario #3), UE 2401 encounters an MBMS coverage hole. In step 2425, UE 2401 performs RRC establishment with a new cause of group communication. UE 2401 resumes the unicast transmission in step 2426 after RRC establishment. Later on, when UE 2401 is out of the MBMS coverage hole, in step 2427, UE 2401 switches PoC traffic from the unicast bearer to the MBMS bearer so that the unicast bearer is freed for other UEs if the network is congested.

In addition to reuse EPS MBMS radio transmission for broadcasting PoC DL traffic to support idle mode reception, EUTRAN dynamic scheduling mechanism for delivering PoC DL traffic to a group of PoC UEs can also be reused to support idle mode reception. In EUTRAN, radio unicast traffic is scrambled by a UE-specific C-RNTI. Similar to PoC traffic, the group of PoC UEs can be informed to monitor scheduling assignment scrambled by a group-specific g-RNTI in idle mode. Since EPS MBMS does not support UE mobility management, eNB is not aware of when UE moves out of the coverage. For applications where the PoC traffic becomes irrelevant when UE moves out of certain area, idle mode reception is still possible. For idle mode reception, PoC UEs should first acquired necessary information before performing idle mode reception. For example, the necessary information includes which g-RNTI to monitor. The PoC UEs can acquired the necessary information via dedicated RRC signaling while UE is in RRC_Connected mode, or via non-dedicated RRC signaling while UE is in RRC_IDLE mode.

Figure 25:
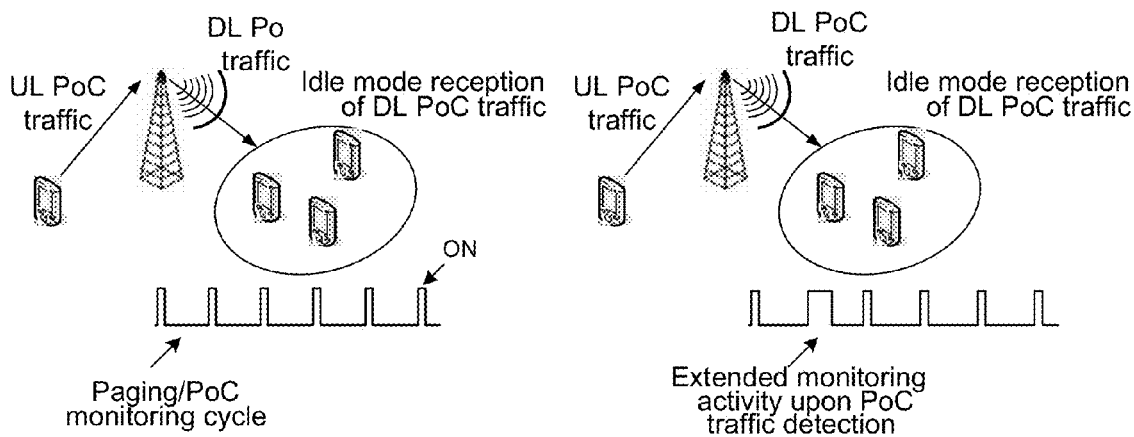
FIG. 25 illustrates one embodiment of monitoring PoC traffic in RRC_IDLE mode.

FIG. 25 illustrates one embodiment of monitoring PoC traffic in RRC_IDLE mode. When using dynamic scheduling for PoC DL traffic, the scheduling assignment (PDCCH) scrambled by g-RNTI for PoC DL traffic can be given within common search space to reduce idle mode UE blind PDCCH decoding attempts. This is similar to scheduling assignment for paging message is given. In addition, the monitoring cycle for g-RNTI can be aligned with paging cycle for power saving. As illustrated in the left part of FIG. 25, in RRC_IDLE mode, both group-RNTI and paging-RNTI are monitored during the ON period of the same paging cycle. The paging cycle is tuned to achieve a tradeoff between PoC data plane latency and UE power consumption. For optimization, once PoC DL traffic is received in idle mode, UE should keep monitoring group-RNTI for an extended fixed amount of time as illustrated in the right part of FIG. 25. This is because group communication traffic can be bursty depending on traffic type, and UE is likely to receive more group communication traffic during the extended ON period upon traffic detection. With idle mode reception, the network has no idea when UE moves out of current service area for PoC DL traffic. This generates waste when there is no longer any UE interested in the PoC DL traffic. To solve this problem, UE can perform tracking area update (TAU) when it moves out of the service area. The core network can then decide whether to stop PoC transmission to a certain area based on the information.

Figure 26:
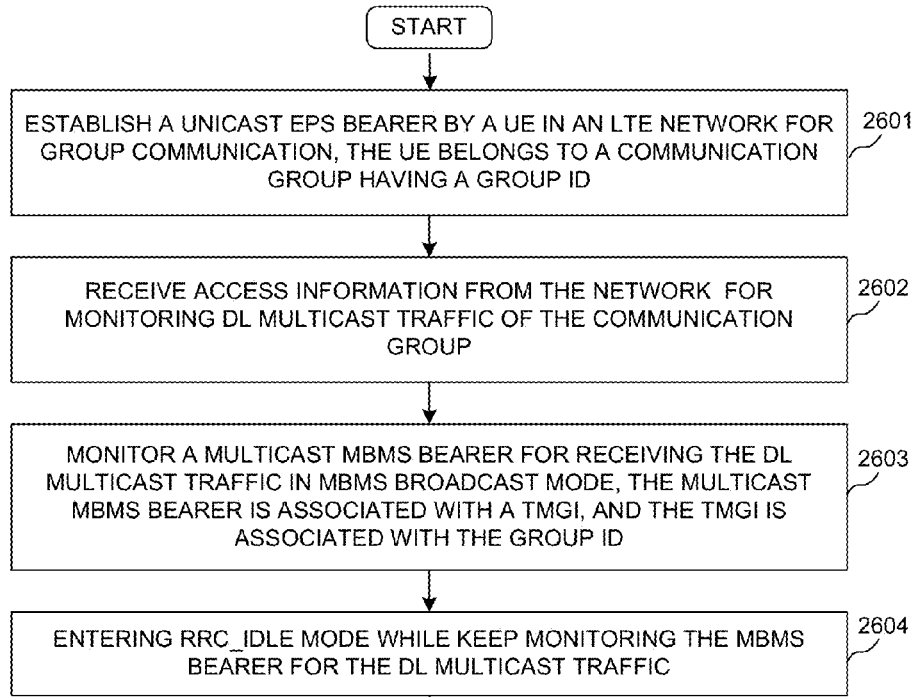
FIG. 26 is a flow chart of a method of supporting idle mode reception for PoC traffic in accordance with one novel aspect.

FIG. 26 is a flow chart of a method of supporting idle mode reception for PoC traffic in accordance with one novel aspect. In step 2601, a UE established a unicast EPS bearer in an LTE network for group communication. The UE belongs to a communication group having a communication group ID. In step 2602, the UE receives access information from the network for monitoring DL multicast traffic of the communication group based on a multicast decision. In step 2603, the UE monitors a multicast MBMS bearer for receiving the DL multicast traffic. The multicast MBMS bearer is associated with a TMGI, and the TMGI is associated with the communication group ID. In one embodiment, the access information comprise mapping information between the TMGI and the communication group ID. In step 2604, the UE enters RRC_IDLE mode while keep monitoring the MBMS bearer for receiving the DL multicast traffic. In one embodiment, the UE receives the DL group communication in MBSFN subframes broadcasted in a camped cell. In another embodiment, receives the DL group communication via monitoring a Physical Downlink Control Channel (PDCCH) addressed to a group-RNTI.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a unicast Evolved Packet Service (EPS) bearer by a user equipment (UE) in a Long-Term Evolution (LTE) network for receiving downlink (DL) unicast traffic of DL group communication, wherein the UE belongs to a communication group having a communication group identity (ID), wherein the UE indicates a group communication interest when requesting to establish the unicast bearer;
   receiving access information from the network for monitoring downlink (DL) multicast traffic of the DL group communication based on a multicast decision triggered by the group communication interest, wherein the multicast decision is for dynamically configuring a multicast Multimedia Broadcast Multicast Service (MBMS) bearer; and
   monitoring the MBMS bearer for receiving the DL multicast traffic using the access information, wherein the multicast MBMS bearer is associated with a Temporary Mobile Group Identifier (TMGI), and wherein the TMGI is associated with the communication group ID.

2. The method of claim 1, wherein the UE associates the unicast bearer and the multicast bearer, and wherein the UE receives data from both bearers to a group communication application associated with the group ID.

3. The method of claim 1, wherein the DL group communication is a type of DL Push-to-Talk over Cellular (PoC) traffic, and wherein the UE belongs to a PoC group having a PoC group ID.

4. The method of claim 1, wherein the access information comprises mapping information between the TMGI and the communication group ID.

5. The method of claim 1, wherein the access information is received via non-dedicated RRC signaling, signaling in data plane, or by predefined mapping between the TMGI and the communication group ID.

6. The method of claim 1, wherein the UE acquires TMGI through an application layer protocol after a Packet Data Network (PDN) connection setup is completed when establishing the EPS bearer.

7. The method of claim 1, wherein a TMGI list of communication groups is assigned by the network when establishing the MBMS bearer, and wherein the UE acquires the TMGI from the TMGI list when establishing the EPS bearer.

8. The method of claim 1, wherein the association between TMGI and the communication group ID is changed regularly.

9. The method of claim 8, wherein the association is changed through an application layer protocol or through specific Non-Access-Stratum (NAS) layer messaging.

10. The method of claim 1, wherein the UE reports MBMS capability information and/or MBMS reception status to the network for making the multicast decision.

11. The method of claim 1, wherein the UE mobility information is reported to a mobility management entity for group mobility management and for making the multicast decision, and wherein the UE mobility information comprises a serving cell.

12. The method of claim 11, wherein the multicast decision is based on a list of factors comprising at least one of a number of group members in a cell, a number of communication groups in a cell, UE mobility information, and channel reliability information.

13. The method of claim 1, wherein the DL multicast traffic is delivered within an MBSFN area.

14. The method of claim 13, wherein the MBSFN area corresponds to one multicast group defined as a subset of the communication group.

15. The method of claim 1, wherein the DL multicast traffic is delivered to a multicast group in MBMS multicast mode, and wherein the multicast group is defined as a subset of the communication group.

16. A user equipment (UE), comprising:
   a configuration module that establishes a unicast Evolved Packet Service (EPS) bearer in a Long-Term Evolution (LTE) network for receiving downlink (DL) unicast traffic of DL group communication, wherein the UE belongs to a communication group having a communication group identity (ID), wherein the UE indicates a group communication interest when requesting to establish the unicast bearer;
   a receiver that receives access information from the network for monitoring downlink (DL) multicast traffic of the communication group based on a multicast decision triggered by the group communication interest, wherein the multicast decision is for dynamically configuring a multicast Multimedia Broadcast Multicast Service (MBMS) bearer; and
   a group communication module that monitors the MBMS bearer for receiving the DL group communication using the access information, wherein the multicast MBMS bearer is associated with a Temporary Mobile Group Identifier (TMGI), and wherein the TMGI is associated with the communication group ID.

17. The UE of claim 16, wherein the UE associates the unicast bearer and the multicast bearer, and wherein the UE receives data from both bearers to a group communication application associated with the group ID.

18. The UE of claim 16, wherein the DL group communication is a type of DL Push-to-Talk over Cellular (PoC) traffic, and wherein the UE belongs to a PoC group having a PoC group ID.

19. The UE of claim 16, wherein the access information comprises mapping information between the TMGI and the communication group ID.

20. The UE of claim 16, wherein the UE mobility information is reported to a mobility management entity for group mobility management and for making the multicast decision, and wherein the UE mobility information comprises a serving cell.

21. The UE of claim 20, wherein the multicast decision is based on a list of factors comprising at least one of a number of group members in a cell, a number of communication groups in a cell, UE mobility information, and channel reliability information.

* * * * *